(12) United States Patent
Jumonji et al.

(10) Patent No.: US 12,553,195 B2
(45) Date of Patent: Feb. 17, 2026

(54) DETERIORATION DETERMINATION DEVICE, DETERIORATION DETERMINATION METHOD, AND RECORDING MEDIUM

(71) Applicant: NEC Corporation, Tokyo (JP)

(72) Inventors: Nana Jumonji, Tokyo (JP); Yosuke Kimura, Tokyo (JP); Chisato Sugawara, Tokyo (JP); Takakazu Ishii, Tokyo (JP); Shouhei Ohno, Tokyo (JP); Hiromichi Hirata, Tokyo (JP); Daisuke Hashizume, Tokyo (JP)

(73) Assignee: NEC CORPORATION, Tokyo (JP)

( * ) Notice: Subject to any disclaimer, the term of this patent is extended or adjusted under 35 U.S.C. 154(b) by 391 days.

(21) Appl. No.: 18/030,239

(22) PCT Filed: Oct. 15, 2020

(86) PCT No.: PCT/JP2020/038976
§ 371 (c)(1),
(2) Date: Apr. 4, 2023

(87) PCT Pub. No.: WO2022/079867
PCT Pub. Date: Apr. 21, 2022

(65) Prior Publication Data
US 2024/0026615 A1  Jan. 25, 2024

(51) Int. Cl.
*E01C 23/01* (2006.01)
*G01S 13/90* (2006.01)

(52) U.S. Cl.
CPC .......... *E01C 23/01* (2013.01); *G01S 13/9005* (2013.01); *G01S 13/9027* (2019.05)

(58) Field of Classification Search
CPC .. G01S 13/90; G01S 13/9027; G01S 13/9005; G01S 13/9023; G08G 1/00
(Continued)

(56) References Cited

U.S. PATENT DOCUMENTS

2013/0173208 A1   7/2013   Kuzunishi et al.
2016/0040984 A1*  2/2016   Byrne .................. G06T 7/55
                                                348/92

(Continued)

FOREIGN PATENT DOCUMENTS

JP   2011-032853 A   2/2011
JP   2013-140448 A   7/2013
(Continued)

OTHER PUBLICATIONS

Eriksson et al.—The Pothole Patrol: Using a Mobile Sensor Network for Road Surface Monitoring (Year: 2008).*
(Continued)

*Primary Examiner* — Sujoy K Kundu

(57) ABSTRACT

A deterioration determination device includes: a memory; and at least one processor coupled to the memory. The processor performs operations. The operations include: acquiring a diagnosis result of first deterioration of a structure and a determination result of displacement of a ground surface including the structure; determining second deterioration of the structure using the diagnosis result of the first
(Continued)

deterioration and the determination result of the displacement of the ground surface; and outputting the second deterioration and a position of the second deterioration.

9 Claims, 13 Drawing Sheets

(58) Field of Classification Search
USPC .......................................................... 702/34
See application file for complete search history.

(56) References Cited

U.S. PATENT DOCUMENTS

| | | | |
|---|---|---|---|
| 2018/0052117 A1* | 2/2018 | Imai | G01B 11/30 |
| 2020/0292411 A1* | 9/2020 | Ohta | G06T 7/001 |
| 2021/0223389 A1 | 7/2021 | Ikefuji et al. | |

FOREIGN PATENT DOCUMENTS

| | | |
|---|---|---|
| JP | 2018-084126 A | 5/2018 |
| JP | 2019-185443 A | 10/2019 |
| JP | 2020-020194 A | 2/2020 |
| WO | 2017/047315 A1 | 3/2017 |
| WO | 2019/220574 A1 | 11/2019 |

OTHER PUBLICATIONS

JP Office Communication for JP Application No. 2022-556783, mailed on Jun. 4, 2024 with English Translation.
International Search Report for PCT Application No. PCT/JP2020/038976, mailed on Dec. 22, 2020.
English translation of Written opinion for PCT Application No. PCT/JP2020/038976, mailed on Dec. 22. 2020.
Motoyuki Sato et al., "Displacement and Vibration Monitoring by Ground-based synthetic aperture radar (GB-SAR)", Electronic Information Communication Engineers Paper B, vol. J102-B, No. 11, Nov. 1, 2019, pp. 844-852.
Gen Kanaya et al., "Regarding possibility of road deformation detection technology using satellite SAR data", 63rd (2019), Hokkaido Development Technology Research Presentation Paper, Ministry of Land, Infrastructure, Transport and Tourism, Hokkaido Regional Development Bureau, Feb. 18, 2020, pp. 1-6, <https://www.hkd.mlit.go.jp/ky/jg/gijyutu/splaat00001tZer-att/splaat00001t2ih.pdf>.
JP Office Communication for JP Application No. 2024-075574, mailed on Jul. 15, 2025 with English Translation.

* cited by examiner

Fig. 2

|  | | GROUND DISPLACEMENT | |
|---|---|---|---|
|  | | SMALL | LARGE |
| DETERIORATION | SMALL | LEVEL 1 | LEVEL 2 |
| | LARGE | LEVEL 3 | LEVEL 4 |

DETERIORATION DETERMINATION DEVICE, DETERIORATION DETERMINATION METHOD, AND RECORDING MEDIUM

This application is a National Stage Entry of PCT/JP2020/038976 filed on Oct. 15, 2020, the contents of all of which are incorporated herein by reference, in their entirety.

TECHNICAL FIELD

The present invention relates to determination of deterioration of a structure.

BACKGROUND ART

A structure constituting a social infrastructure such as a road has a large influence on society when the structure becomes unusable. However, the structure deteriorates over time. Therefore, deterioration of a structure is confirmed, and repair or the like is performed before the structure deteriorates and becomes unusable.

However, a structure constituting a social infrastructure is generally a considerably large construction. Therefore, confirming deterioration of the structure requires a lot of labor and cost.

Therefore, a device that assists or improves efficiency in measurement of deterioration of a structure or the like has been proposed (see, for example, PTLs 1 and 2).

A road surface search program described in PTL 1 determines a deteriorated point on a road surface using a measurement frequency of acceleration at a deterioration candidate point.

A road management system described in PTL 2 predicts the change in road surface property based on the change in the road surface property (profile of road surface indicating irregularity displacement of road surface) and a transition of traffic volume in a measurement period.

CITATION LIST

Patent Literature

PTL 1: JP 2013-140448 A
PTL 2: JP 2019-185443 A

SUMMARY OF INVENTION

Technical Problem

Deterioration of a structure does not necessarily proceed independently in each portion of the structure. A structure serving as a social infrastructure is generally considerably larger than a vehicle. Therefore, it is desirable to determine deterioration of a structure using information related to a change in a wider range in addition to a measurement result of deterioration in an individual portion such as a passing point of a vehicle on a surface of a road.

The deterioration does not necessarily progress from a surface (for example, surface layer of road surface) of the structure. For example, when ground sinking occurs in ground that is a base of a structure such as a paved road, deterioration associated with ground sinking may occur in the structure such as the paved road.

The techniques described in PTLs 1 and 2 are techniques for determining deterioration based on an uneven state of a surface of a road at each point through which a vehicle passes. Therefore, the techniques described in PTLs 1 and 2 can be executed for the deterioration determination based on the uneven state of the surface of the structure, but cannot execute determination using a displacement of the ground surface serving as the basis of the road.

As described above, the techniques described in PTLs 1 and 2 have an issue that accuracy cannot be improved with respect to determination of deterioration of a structure.

An object of the present invention is to provide a deterioration determination device and the like that solve the above issues and improve the accuracy of determining deterioration of a structure.

Solution to Problem

According to an aspect of the present invention, there is provided a deterioration determination device including:
a memory; and
at least one processor coupled to the memory.
The processor performs operations. The operations include:
acquiring a diagnosis result of first deterioration of a structure and a determination result of a displacement of a ground surface including the structure;
determining second deterioration of the structure using the diagnosis result of the first deterioration and the determination result of the displacement of the ground surface; and
outputting the second deterioration and a position of the second deterioration.

According to an aspect of the present invention, there is provided a deterioration determination system including:
a deterioration determination device including
a memory; and
at least one processor coupled to the memory.
The processor performs operations. The operations include:
acquiring a diagnosis result of first deterioration of a structure and a determination result of a displacement of a ground surface including the structure,
determining second deterioration of the structure using the diagnosis result of the first deterioration and the determination result of the displacement of the ground surface,
outputting the second deterioration and a position of the second deterioration,
generating the diagnosis result of the first deterioration using sensor information related to a surface layer of the structure acquired by a terminal device mounted on a mobile body, and
generating the determination result of the displacement of the ground surface using an observation result of a synthetic aperture radar;
the terminal device mounted on the mobile body that transmits the diagnosis result of the first deterioration to the deterioration determination device;
the synthetic aperture radar that transmits a determination result of the displacement of the ground surface including the structure to the deterioration determination device; and
a display device that acquires the second deterioration and a position of the second deterioration from the deterioration determination device, and displays the second deterioration in association with the position of the second deterioration.

According to an aspect of the present invention, there is provided a deterioration determination method including:
acquiring a diagnosis result of first deterioration of a structure and a determination result of a displacement of a ground surface including the structure;
determining second deterioration of the structure using the diagnosis result of the first deterioration and the determination result of the displacement of the ground surface; and
outputting the second deterioration and a position of the second deterioration.

According to an aspect of the present invention, there is provided a non-transitory computer-readable recording medium embodies a program. The program causes a computer to perform a method. The method includes:
acquiring a diagnosis result of first deterioration of a structure and a determination result of a displacement of a ground surface including the structure;
determining second deterioration of the structure using the diagnosis result of the first deterioration and the determination result of the displacement of the ground surface; and
outputting the second deterioration and a position of the second deterioration.

Advantageous Effects of Invention

According to the present invention, it is possible to achieve an effect of improving accuracy of determining deterioration of a structure.

BRIEF DESCRIPTION OF DRAWINGS

FIG. 2 is a diagram illustrating an example of determination in a determination unit.

EXAMPLE EMBODIMENT

Figure 1:
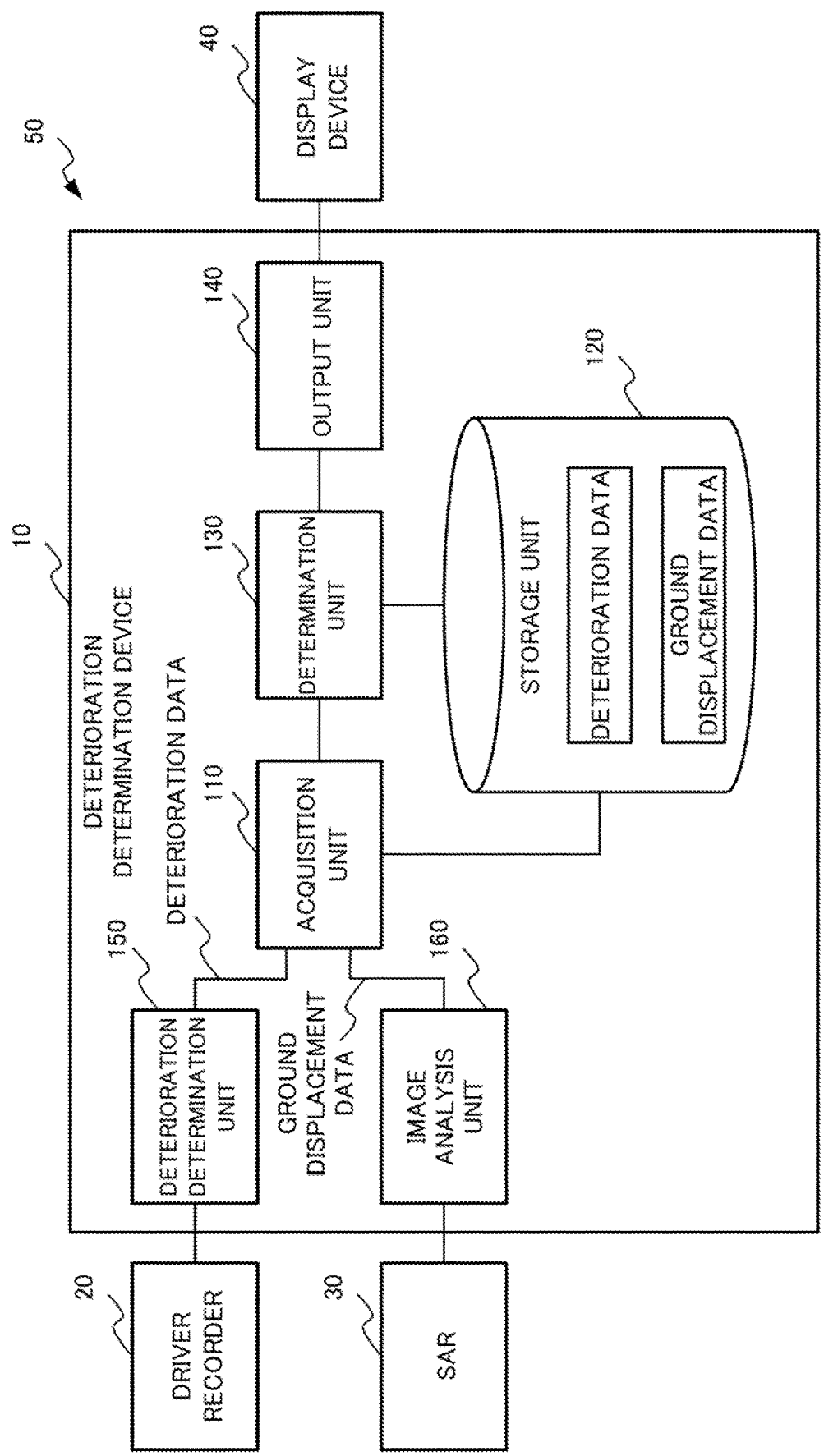
FIG. 1 is a block diagram illustrating an example of a configuration of a deterioration determination system including a deterioration determination device according to a first example embodiment of the present invention.

Next, an example embodiment of the present invention will be described with reference to the drawings.

Each drawing is for describing an example embodiment of the present invention. However, the example embodiment of the present invention is not limited to the description of each drawing. Similar configurations in the drawings are denoted by the same reference numerals, and repeated description thereof may be omitted. In the drawings used in the following description, in the description of the example embodiments of the present invention, the description of portions not related to the solution of the problem of the present invention may be omitted and not illustrated.

Terms

First, terms used for description of each example embodiment will be described.

"Sensor information" is information acquired using a predetermined sensor in order to determine deterioration in a portion to be determined in a structure (for example, a road, a bridge, a platform, an embankment, a pier, a seawall, or a runway). In each example embodiment, information related to a structure acquired using a predetermined sensor (for example, an accelerometer or camera) included in a terminal device (for example, a drive recorder) mounted on a mobile body (for example, a vehicle, a two-wheeled vehicle, a drone, or a person) is used as the sensor information. For example, the sensor information is acceleration detected by an accelerometer of a drive recorder mounted on a vehicle that has traveled a structure that is a deterioration determination target, or an image captured by the drive recorder.

"Deterioration" is a degree of deterioration in a portion to be determined in the structure, which is determined using the sensor information.

In each example embodiment, an expression form of the deterioration is arbitrary. For example, a numerical value may be used as the deterioration. Alternatively, a value other than a numerical value may be used as the deterioration. For example, characters such as {large, small} or {large, medium, small} may be used as the deterioration.

When a value is used as the deterioration, a range of the value of the deterioration is arbitrary.

For example, when a "crack rate" of a road surface is used as the deterioration, the value of the deterioration is in a range of 0.0 to 1.0 (0% to 100%).

The crack rate is a value obtained by dividing an area of a crack by an area of an investigation target section.

Alternatively, when a "rutting amount" is used as the deterioration, the value of the deterioration is generally an integer (the unit is mm) equal to or more than 0. A rational number may be used as the value of the rutting amount.

The rutting amount is a height from a rutting portion to a protrusion in a predetermined range (for example, 20 m).

Alternatively, when "International Roughness Index (IRI)" is used as the deterioration, the value of the deterioration is a rational number (the unit is mm/m or m/km) equal to or more than 0.

IRI is an evaluation index for unevenness of a paved road proposed by the World Bank in 1986.

Even when "Boeing Bump Index (BBI)" is used as the deterioration, the value of the deterioration is a rational number (the unit is dimensionless) equal to or more than 0.

BBI is a flatness index adopted by the United Nations Aviation Administration in 2009.

As described above, the range of the value of the deterioration is arbitrary. The user of each example embodiment may appropriately select the deterioration corresponding to the deterioration in the structure to be determined.

In the following description, the "crack rate" will be used as an example of the deterioration. Therefore, in the following description, when the deterioration is degraded, the value of the deterioration increases. However, as the value of the deterioration, a value in which the value decreases when the deterioration is degraded may be used in relation to processing using the deterioration.

A "deterioration speed" is a degree of change in the deterioration with respect to time.

In each example embodiment, the deterioration speed may be temporally constant or may change. A user may select a type of deterioration speed according to the determination target. For example, linear approximation such as linear regression may be used as the deterioration speed. Alternatively, a quadratic curve (quadratic regression) may be used as the deterioration speed.

Further, each example embodiment may use a deterioration corresponding to a plurality of deteriorations as a diagnosis result of deterioration. For example, in each example embodiment, when the deterioration is a crack generated in the structure and a rut, the deterioration is, for example, the crack rate and the rutting amount. In this case, each example embodiment may use the deterioration speed in addition to the deterioration for each deterioration.

In the following description, a case where one deterioration (as described above, the crack rate) is used will be described for clarity of description.

Here, "deterioration data" is data related to the diagnosis result of the deterioration of the structure. For example, the deterioration data is data including a type (crack, rut, or the like) of the deterioration determined based on a state of a surface layer of a structure and a position of the deterioration.

Specifically, the deterioration data may be a type of deterioration of a road surface determined using an image captured by a drive recorder mounted on the vehicle, a deterioration, and a position of the deterioration.

Alternatively, the deterioration data may be the crack rate of a road surface determined using an image captured by a drive recorder mounted on the vehicle and a position of the crack.

However, the deterioration data may be data determined using information different from the image captured by the drive recorder. For example, the deterioration data may be data determined using an accelerometer mounted on the vehicle.

In the following description, as an example of the deterioration data (data related to the diagnosis result of the first deterioration of the structure), the deterioration of the crack determined using the image captured by the drive recorder and the position of the crack are used. In this case, the first deterioration is, for example, the crack of the structure.

Each example embodiment determines the deterioration of the structure using deterioration data (data related to the diagnosis result of first deterioration of the structure). The deterioration of the structure determined using the deterioration data is referred to as "second deterioration".

The "surface layer" of the structure is a portion including a range where deterioration can be confirmed from the outside of the structure, for example, a surface and a predetermined range close to the surface. For example, the surface layer of the structure is a portion including a surface and a range from the surface to a predetermined depth. Alternatively, the surface layer of the structure is a configuration (for example, in the case of a paved road, a surface layer in contact with a tire of a vehicle) in contact with another object in the structure.

In the following description, a portion excluding the surface layer of the structure is referred to as a "deep layer".

Some drive recorders can acquire data other than the position and image. For example, some drive recorders can acquire acceleration. In such a case, the deterioration data may include acceleration.

Alternatively, the deterioration data may include the images (still image and/or moving image) captured by the drive recorder.

The "synthetic aperture radar (hereinafter, "SAR"))" is a radar that transmits and receives radio waves while a flying object (such as an artificial satellite or an airplane) is moving, and obtains an image equivalent to that in the case of an antenna having a large opening.

A resolution in radar observation is improved as a size of an antenna is increased. However, the size of an antenna that can be mounted on an artificial satellite or the like is limited. Therefore, the SAR uses an antenna having a small actual aperture length to transmit and receive radio waves while flying (that is, by artificially "synthesizing" the "opening"), thereby improving resolution in the traveling direction (that is, a virtually large antenna is configured).

An "interference SAR" is a technology in which two observations using SAR are performed on the same place on the earth's surface, and a distance difference (for example, in the case of the ground surface, a displacement (sinking or protrusion) of the ground surface) to the place between two observations is measured from a difference between "phases" of two reflected waves.

The sign of the displacement of the ground surface is arbitrary. The sign when the sinking increases may be positive. Alternatively, the sign in a case where the protrusion increases may be positive. Alternatively, the displacement may be an absolute value.

A "ground displacement speed" is a degree of change (for example, mm/year) in a displacement (sinking or protrusion) of the ground surface with respect to time. In the following description, it is assumed that the sign of the ground displacement speed is positive in a direction in which the sinking speed increases. However, the sign of the ground displacement speed may be positive in a direction in which the speed of the protrusion increases. Alternatively, the ground displacement speed may be an absolute value.

The "ground displacement data" is a determination result of the ground surface including the structure. For example, the ground displacement data is data of displacement of the ground surface such as the sinking and protrusion. For example, the ground displacement data is data including a displacement of the ground surface measured using the interference SAR and a position of the displacement.

The ground displacement data may be data measured using a technology different from the interference SAR as long as the data is data obtained by measuring displacement (sinking or protrusion) in a range of a certain size on the ground surface. However, in the following description, data of the displacement of the ground surface measured using the interference SAR is used as an example of the ground displacement data.

Specifically, the interference SAR measures a displacement of a distance to a structure on the ground (the ground supporting foundation of the structure) as the displacement. However, in general, deformation of the structure is smaller than the change in the ground. The interference SAR measures the displacement of the ground surface and the like using a noise removal technique based on various factors. Therefore, each example embodiment operates by regarding the displacement of the distance measured using the interference SAR as the displacement of the surface (that is, the ground surface) of the ground on which the structure is based.

First Example Embodiment

Hereinafter, a first example embodiment will be described with reference to the drawings.

Description of Configuration

First, a configuration of a deterioration determination device 10 according to the first example embodiment will be described with reference to the drawings.

FIG. 1 is a block diagram illustrating an example of a configuration of a deterioration determination system 50 including the deterioration determination device 10 according to the first example embodiment of the present invention.

The deterioration determination system 50 includes the deterioration determination device 10, a drive recorder 20, a SAR 30, and a display device 40.

The devices included in the deterioration determination system 50 are connected via a predetermined communication path (for example, the Internet or a public telephone line). The communication path may be wired, wireless, or a combination of wired and wireless.

The drive recorder 20 is a terminal device mounted on a mobile body (for example, a vehicle), and acquires sensor information (for example, a surface image (for example, an image of a road surface) of a structure) related to a structure (for example, a road, a bridge, a platform, an embankment, a pier, a seawall, or a runway) to be determined. The drive recorder 20 then transmits the acquired sensor information to the deterioration determination device 10.

The drive recorder 20 may be a terminal device capable of acquiring a video, acceleration, and the like. The mobile body is arbitrary as long as the terminal device can be mounted. For example, the mobile body may be a vehicle, a two-wheeled vehicle, or a drone. Alternatively, a person may carry the terminal device.

The SAR 30 is a device or system that observes a predetermined range including a structure to be determined using SAR (interference SAR) and transmits an observation result to the deterioration determination device 10.

The display device 40 includes a display device such as a liquid crystal display, and displays the determination result acquired from the deterioration determination device 10. The deterioration determination system 50 may use an arbitrary device as the display device 40. For example, the display device 40 may be a display device included in a local government system that manages roads. Alternatively, the display device 40 may be a terminal device of a worker who confirms a structure.

A display format in the display device 40 is arbitrary. A creator, a user, or the like of the deterioration determination system 50 may appropriately select the display format according to the purpose of use of the display.

The deterioration determination device 10 determines deterioration (second deterioration) of the structure to be determined using the deterioration data related to the diagnosis result of the first deterioration and the ground displacement data. Then, the deterioration determination device 10 transmits the determination result to the display device 40 or a device (not illustrated). The deterioration determination device 10 may store the determination result.

Next, a configuration of the deterioration determination device 10 will be described.

The deterioration determination device 10 includes an acquisition unit 110, a storage unit 120, a determination unit 130, an output unit 140, a deterioration determination unit 150, and an image analysis unit 160.

The deterioration determination unit 150 calculates the deterioration of the surface layer (an example of the first deterioration) in each part of the structure using the sensor information acquired from the drive recorder 20. Then, the deterioration determination unit 150 generates deterioration data including at least the calculated deterioration and the position of the deterioration. That is, the deterioration determination unit 150 generates the deterioration data using the sensor information related to the surface layer of the structure acquired by the terminal device mounted on the mobile body such as the drive recorder 20.

Then, the deterioration determination unit 150 transmits the generated deterioration data to the acquisition unit 110. The deterioration determination unit 150 may include other information (for example, type of deterioration, image, and/or acceleration) in the deterioration data.

Using the observation results acquired from the SAR 30, the image analysis unit 160 generates ground displacement data including at least the displacement of the ground surface and the position of the displacement. Then, the image analysis unit 160 outputs the generated ground displacement data to the acquisition unit 110.

The acquisition unit 110 acquires the deterioration data and ground displacement data. Then, the acquisition unit 110 stores the acquired deterioration data and ground displacement data in the storage unit 120. The timing at which the acquisition unit 110 acquires the deterioration data and the ground displacement data is arbitrary. In the acquisition unit 110, a frequency of acquiring the deterioration data may be different from a frequency of acquiring the ground displacement data.

The number and the data amount of the deterioration data acquired by the acquisition unit 110 may be different from the number and the data amount of the ground displacement data.

Furthermore, the range of positions included in the deterioration data acquired by the acquisition unit 110 may be partially different from the range of positions included in the ground displacement data.

Furthermore, a granularity of the deterioration data acquired by the acquisition unit 110 may be different from a granularity of the ground displacement data.

Furthermore, a data format of the deterioration data acquired by the acquisition unit 110 may be different from a data format of the ground displacement data.

In the determination operation described below, the determination unit 130 may execute the determination operation after appropriately converting the data.

The acquisition unit 110 may store either or both of the deterioration data and the ground displacement data acquired during a predetermined period in the storage unit 120. That is, the acquisition unit 110 may store either or both of the deterioration data and the ground displacement data in the storage unit 120 in time series.

The storage unit 120 stores the deterioration data and the ground displacement data.

Furthermore, the storage unit 120 may store other data. For example, the storage unit 120 may store map data including a structure to be determined. Furthermore, the storage unit 120 may store a plan view or a structural view of the structure to be determined.

The determination unit 130 acquires the deterioration data and the ground displacement data stored in the storage unit 120. However, the determination unit 130 may acquire the deterioration data and the ground displacement data from the acquisition unit 110.

Then, the determination unit 130 determines deterioration (second deterioration) of the structure to be determined using the deterioration data (data related to the diagnosis result of the first deterioration of the structure) and the ground displacement data (determination result of the displacement of the ground surface).

More specifically, the determination unit 130 executes the determination as follows. The deterioration data and the ground displacement data each include a position. Therefore, the determination unit 130 associates the diagnosis result of the first deterioration included in the deterioration data with the displacement included in the ground displacement data using the position included in each data. Then, the determination unit 130 determines the deterioration (second deterioration) of the structure using the diagnosis result of the first deterioration and the displacement of the ground displacement data.

The determination unit 130 may include the position of the determined portion in the determination result in addition to the information indicating the second deterioration. When the storage unit 120 stores map data or the like, the determination unit 130 may associate the determination result with the map data or the like.

Alternatively, in a case where the deterioration data includes the image of the structure, the determination unit 130 may include the image of the structure in the determination result. For example, the determination unit 130 may superimpose or embed the determination result on the image of the structure.

The deterioration data is data indicating deterioration of the surface layer (for example, a pavement surface of a road) of the structure.

Meanwhile, the ground displacement data is data indicating the displacement of the ground surface in a certain range including the structure.

For example, in general, road pavement is often cracked from the surface layer (hereinafter, referred to as a "first deterioration state").

However, when ground sinking occurs, the pavement of the road may have a crack not from the surface layer but from a portion (deep layer) close to the ground. In this case, the crack spreads from the deep layer to the surface layer. That is, when a crack is generated in the surface layer due to ground sinking, the crack spreads from the deep layer to the surface layer. Therefore, in this case, when the crack appears in the surface layer, the crack has already occurred in the entire pavement from the lower part to the upper part (hereinafter, referred to as a "second deterioration state").

Alternatively, the structure straddling the range where the ground sinking has occurred and the range where the ground sinking has not occurred is stressed from the surface layer to the deep layer of the structure at the boundary. Therefore, such a structure is likely to be cracked at the boundary and to be in the second deterioration state.

In the techniques described in PTLs 1 and 2, the first deterioration state and the second deterioration state cannot be distinguished from each other because the determination is made using the uneven shape of the surface of the road.

However, in the determination, the determination unit 130 uses the displacement (ground displacement data) of the ground surface including the structure in addition to the state (deterioration data) of the surface layer of the structure to be determined. Therefore, the determination unit 130 can distinguish between the first deterioration state and the second deterioration state. In this manner, the determination unit 130 can determine deterioration more appropriately than the techniques described in PTLs 1 and 2. That is, the determination unit 130 can improve the accuracy of determination of deterioration of a structure as compared with the techniques described in PTLs 1 and 2.

A determination method in the determination unit 130 is arbitrary. The determination in the determination unit 130 may be determined based on findings (for example, past deterioration determination history) regarding the structure. The determination unit 130 may determine the deterioration using artificial intelligence (AI).

FIG. 2 is a diagram illustrating an example of second deterioration determination in the determination unit 130 according to the first example embodiment.

In the determination of FIG. 2, the determination unit 130 compares each of the deterioration included in the deterioration data and the ground displacement included in the ground displacement data with a predetermined threshold value (hereinafter, referred to as a "deterioration threshold value" and a "displacement threshold value"), and determines "large/small". Then, using the determination results of "large/small", the determination unit 130 determines levels of four types of deterioration (second deterioration) for a portion to be determined in the target structure.

The "small" in the deterioration and the displacement includes a case where there is no deterioration and no displacement.

The determination unit 130 determines that a portion where the deterioration is small and the ground displacement is small is "Level 1". The portion determined to be Level 1 is a portion in a sound state or in a deterioration to an extent that does not hinder operation.

The determination unit 130 determines that a portion where the deterioration is small and the ground displacement is large is "Level 2". The portion determined to be Level 2 is a portion where the surface layer is less deteriorated but the ground surface (that is, ground which is a foundation of the structure) is greatly displaced. Therefore, the portion determined to be Level 2 is a portion in which deterioration may occur in the deep layer (for example, deep layer close to soil of a road) although the deterioration of the surface layer is small. Alternatively, the portion determined to be Level 2 is a portion in which deterioration has not occurred yet but is assumed to be more likely to occur in the future than the portion determined to be Level 1.

The determination unit 130 determines that a portion where the deterioration is large and the ground displacement is small is Level 3. The portion determined to be Level 3 is a portion where the detected deterioration is assumed to be a surface layer and/or a portion close to the surface layer because the displacement of the ground serving as the basis of the structure is small.

The determination unit 130 determines that a portion where the deterioration is large and the ground displacement is large is Level 4. The portion determined to be Level 4 has large displacement of the ground serving as a base of the structure in addition to deterioration of the surface layer. Therefore, the portion determined to be Level 4 is a portion where it is assumed that there is a high possibility that deterioration such as crack has progressed not only to the surface layer but also to the deep layer.

The risks of Levels 1 to 4 are roughly as follows.

Level 1<Level 2≈Level 3<Level 4

However, which of the risk at Level 2 and the risk at Level 3 is larger depends on a target structure and/or a data collection situation. Therefore, for example, the user or the like may determine which one of Level 2 and Level 3 is higher based on the target structure and/or the data collection situation.

In the techniques described in PTLs 1 and 2, deterioration is determined based only on an uneven shape of a surface of a pavement. Therefore, the techniques described in PTLs 1 and 2 cannot distinguish between the Levels 1 and 2 and between the Levels 3 and 4.

The description returns to the description with reference to FIG. 1.

In a case where the storage unit 120 stores the deterioration data and/or the ground displacement data in time series, the determination unit 130 may predict the temporal change of the deterioration (for example, aging) using the temporal change of the deterioration and/or the ground displacement (for example, deterioration speed and/or ground displacement speed).

The determination unit 130 may use different methods or prediction equations for the prediction using the deterioration data and the prediction using the ground displacement data.

The determination unit 130 may change a prediction method or the like using a result of the second deterioration determination such as Levels 1 to 4 described above using the deterioration data and the ground displacement data.

Furthermore, the determination unit 130 may change the method used for prediction in consideration of both the deterioration data and the ground displacement data. For example, in a case where prediction using deterioration data is executed, the determination unit 130 may select a prediction equation based on displacement of the ground surface at a point where deterioration is predicted. For example, the determination unit 130 may use, as the prediction equation used for a point where the displacement of the ground surface is large, a prediction equation in which deterioration progresses faster than the prediction equation used for a point where the displacement of the ground surface is small.

Furthermore, the determination unit 130 may use AI for prediction. In this case, the determination unit 130 may use different AI for AI applied to prediction using the deterioration data and AI applied to prediction using the ground displacement data.

The determination unit 130 may determine deterioration for each section in a predetermined range. For example, the determination unit 130 may determine deterioration in accordance with a management classification used by the user of the deterioration determination system 50.

Alternatively, in a case where the granularity of the data deterioration data is different from the granularity of the ground displacement data, the determination unit 130 may determine the deterioration according to either of the granularities.

For example, in a case where the ground displacement data is data for each predetermined region, the output unit 140 may determine the deterioration using a result (for example, average of deteriorations) obtained by integrating the deterioration of the deterioration data included in each region and the displacement of the region as the determination result of each region.

Then, the determination unit 130 transmits the determination result (including the second deterioration) to the output unit 140.

The determination unit 130 may store the determination result in the storage unit 120.

The output unit 140 outputs the determination result acquired from the determination unit 130 to a predetermined device such as the display device 40. In a case where the determination result includes the position, the output unit 140 outputs the determination result including the position.

In a case where the storage unit 120 stores data (for example, map data) different from the deterioration data and the ground displacement data, the output unit 140 may output the determination result in the determination unit 130 and the data in association with each other.

In this case, for example, the display device 40 may display the determination result by superimposing the determination result on the acquired data (for example, map data).

The display of the determination result will be described with reference to the drawings.

Figure 3:
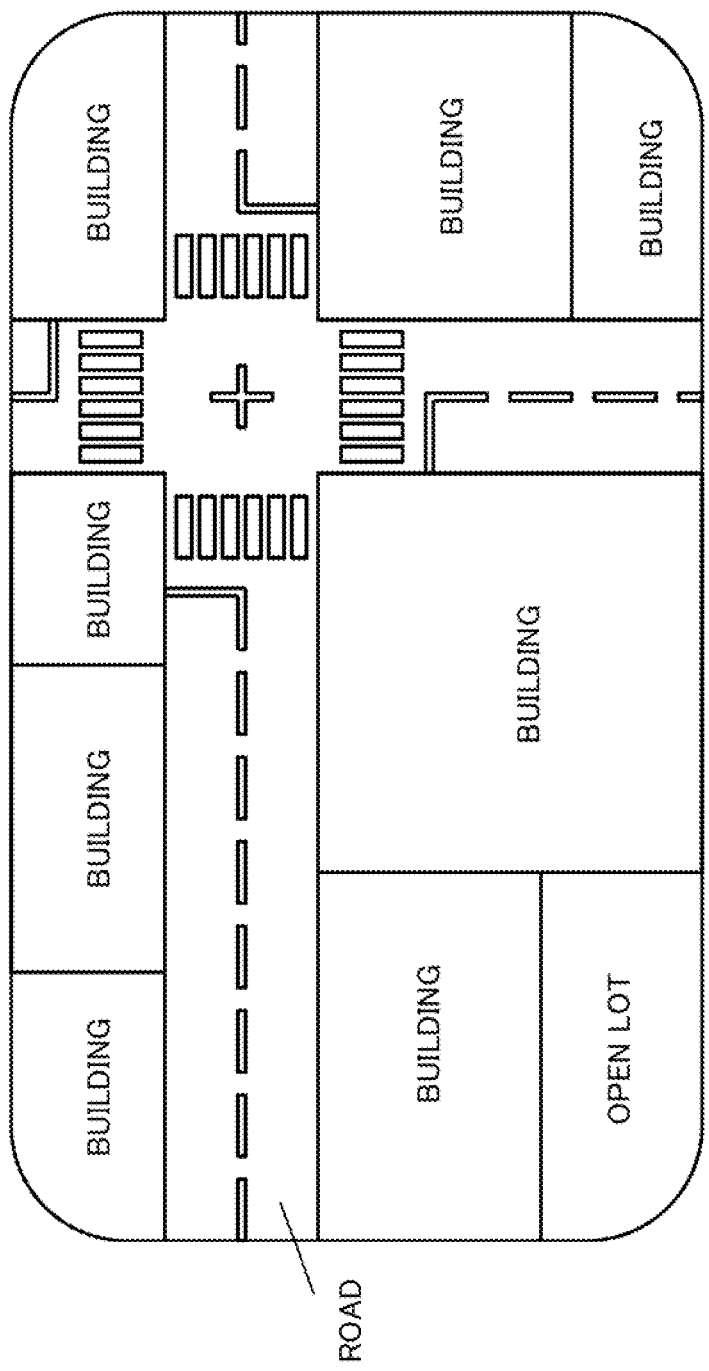
FIG. 3 is a diagram illustrating an example of a road used for description of display.

FIG. 3 is a diagram illustrating an example of a road used for describing a display. FIG. 3 illustrates a road including an intersection as an example of the road.

Figure 4:
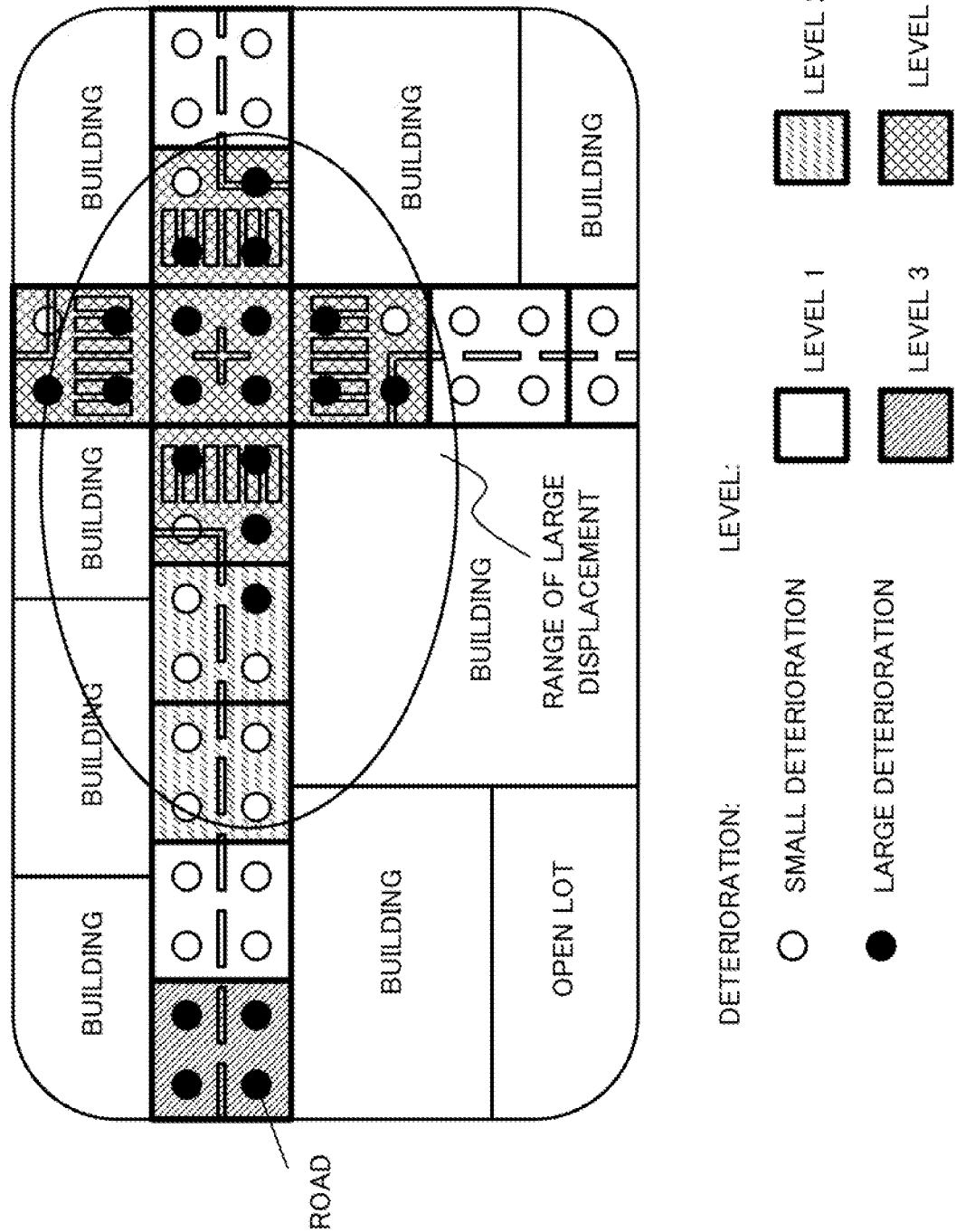
FIG. 4 is a diagram illustrating an example of display of a determination result.

FIG. 4 is a diagram illustrating an example of display of a determination result. For example, the display device 40 displays an image as illustrated in FIG. 4. However, the display on the display device 40 is not limited to FIG. 4.

In FIG. 4, the structure to be determined is the road illustrated in FIG. 3. The level in FIG. 4 is the level described with reference to FIG. 2. In FIG. 4, the road is divided into predetermined portions (bold squares), and a level as a determination result is displayed for each portion.

The portion with the small deterioration is a portion where no deterioration is found. Therefore, the display device 40 may omit the display of the portion with the small deterioration and may display the portion where deterioration is found (for example, most of the deterioration in FIG. 4).

Figure 5:
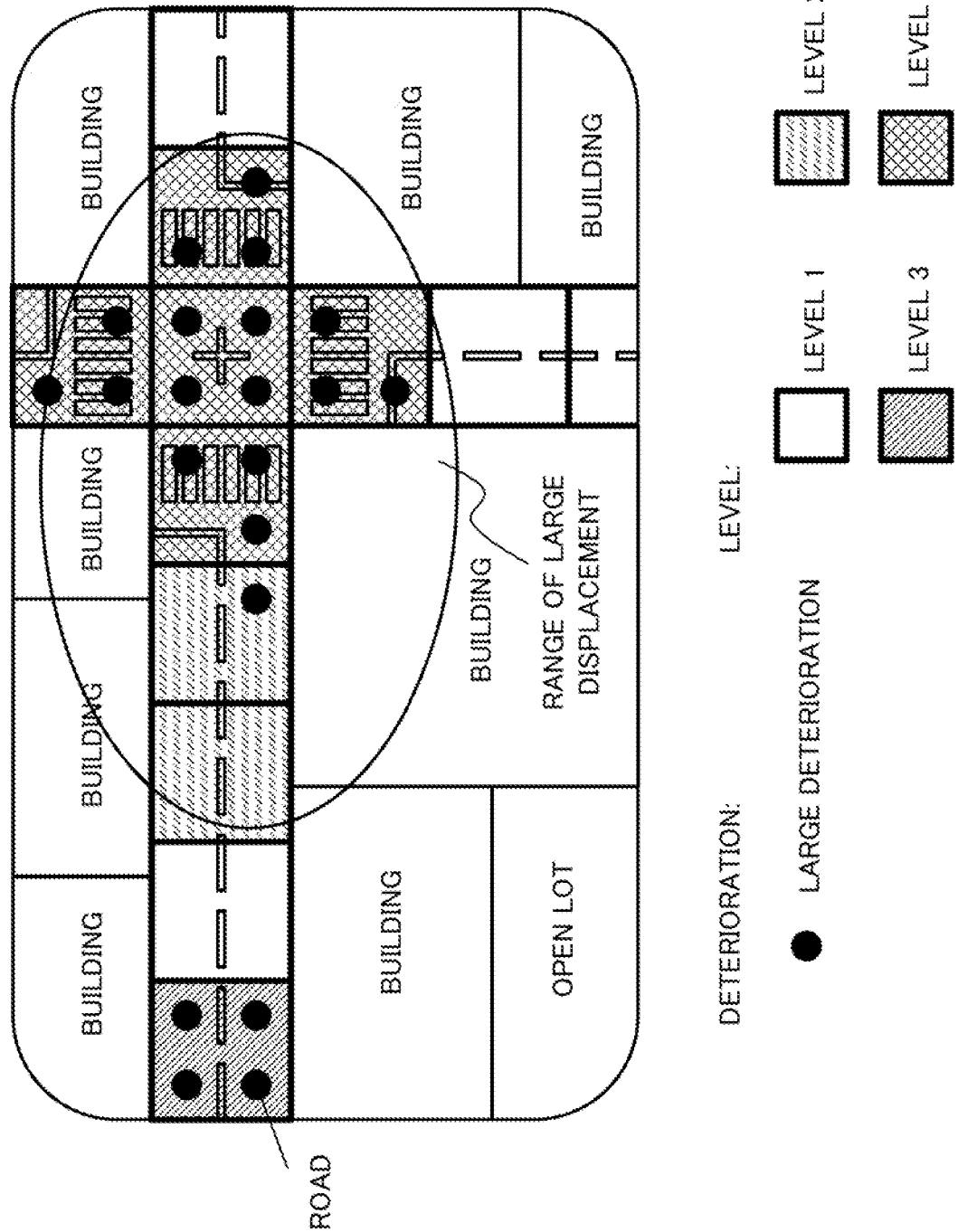
FIG. 5 is a diagram illustrating an example of display of a portion where deterioration is found.

FIG. 5 is a diagram illustrating an example of display of a portion where deterioration is found.

A manager of the structure can more appropriately plan and execute inspection and repair of the structure using the level displayed as illustrated in FIG. 4 or 5.

For example, the confirmation man-hours for determining deterioration of the structure is limited. Therefore, it is desired to provide priority and the like of the part that needs to be confirmed.

The determination results of Levels 1 and 2 are information that can be used to determine the priority of such deterioration confirmation.

It is assumed that the portion determined as Level 2 has a higher possibility of progress of deterioration than the portion determined as Level 1. Therefore, for example, the manager of the structure can appropriately set the future confirmation frequency and the like of the portion determined using the determination results of Levels 1 and 2, such as increasing the confirmation frequency of the portion determined to be Level 2 to be higher than the confirmation frequency of the portion determined to be Level 1.

The repair of the portion determined as Level 3 is repair of the surface layer.

Meanwhile, the repair of the portion determined to be Level 4 is repair of all (for example, all of the pavement of the road) from the surface layer to the deep layer.

The portion determined to be Level 4 is predicted to progress faster in deterioration than the portion determined to be Level 3. Therefore, even in a case where repair of the portion determined to be Level 4 is not immediately necessary, the user may increase the priority of confirmation such that the frequency of confirmation of the portion determined to be Level 4 is higher than the frequency of confirmation of the portion determined to be Level 3.

The man-hours for repairing deterioration of a structure is limited. A repair content in an object to be repaired is information necessary for a repair plan. Therefore, it is desired to provide a necessary repair content in addition to a position where repair is necessary.

The determination results of Levels 3 and 4 are information that can be used to determine such repair contents.

For example, the manager of the structure can appropriately formulate a future repair plan of the determined portion using the determination results of Levels 3 and 4.

The display device 40 may display detailed information in addition to the above display. For example, the display device 40 may partially enlarge and display.

Figure 6:
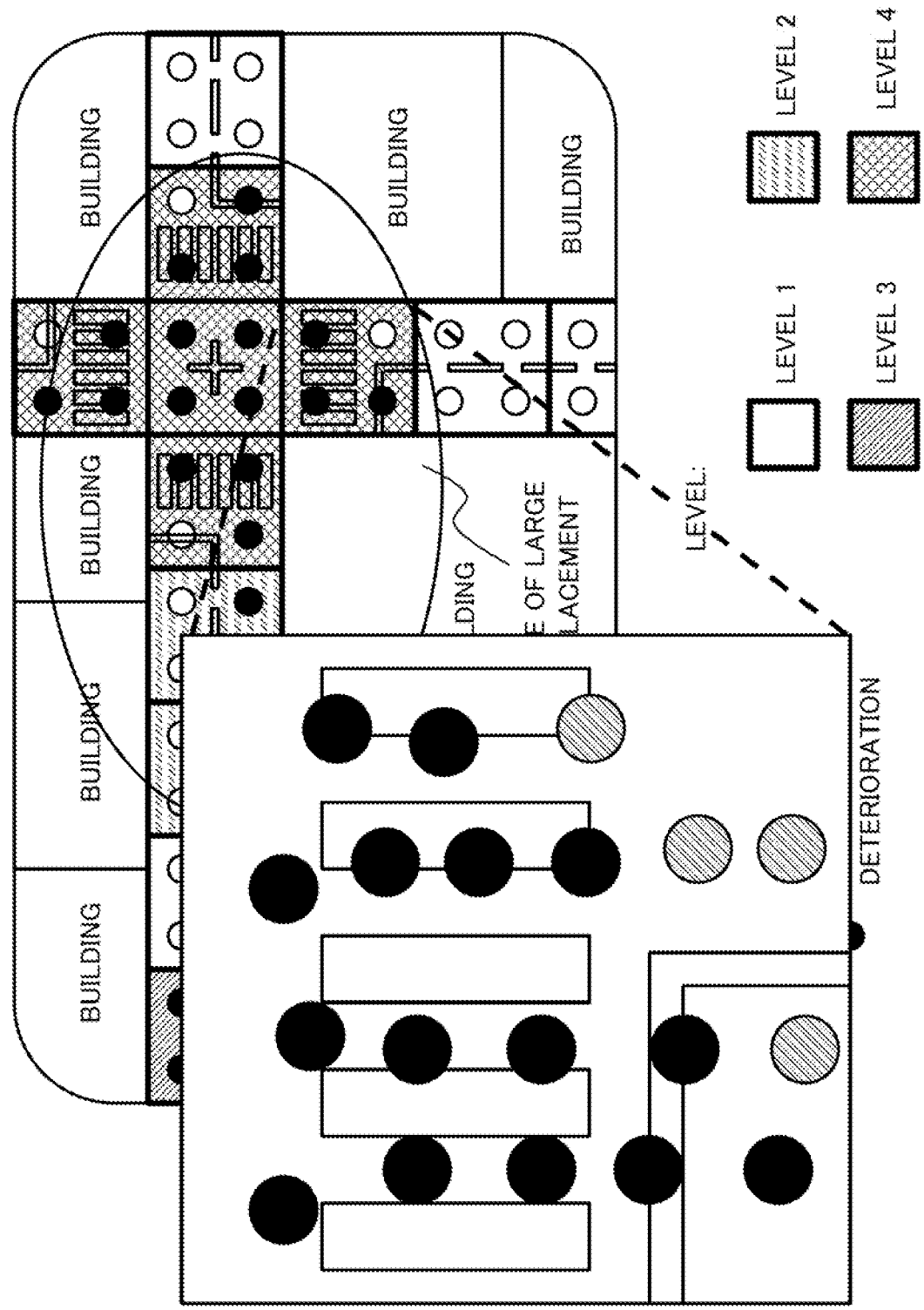
FIG. 6 is a diagram illustrating an example of enlarged display.

FIG. 6 is a diagram illustrating an example of enlarged display. FIG. 6, as an enlarged view, illustrates a deterioration position in more detail than FIG. 4. Further, FIG. 6 separately displays (large deterioration is indicated by a black circle, and medium deterioration is indicated by a diagonal line) the deterioration according to the degree. In FIG. 6, the display of the deterioration is omitted.

Further, the display device 40 may highlight the deterioration position.

Figure 7:
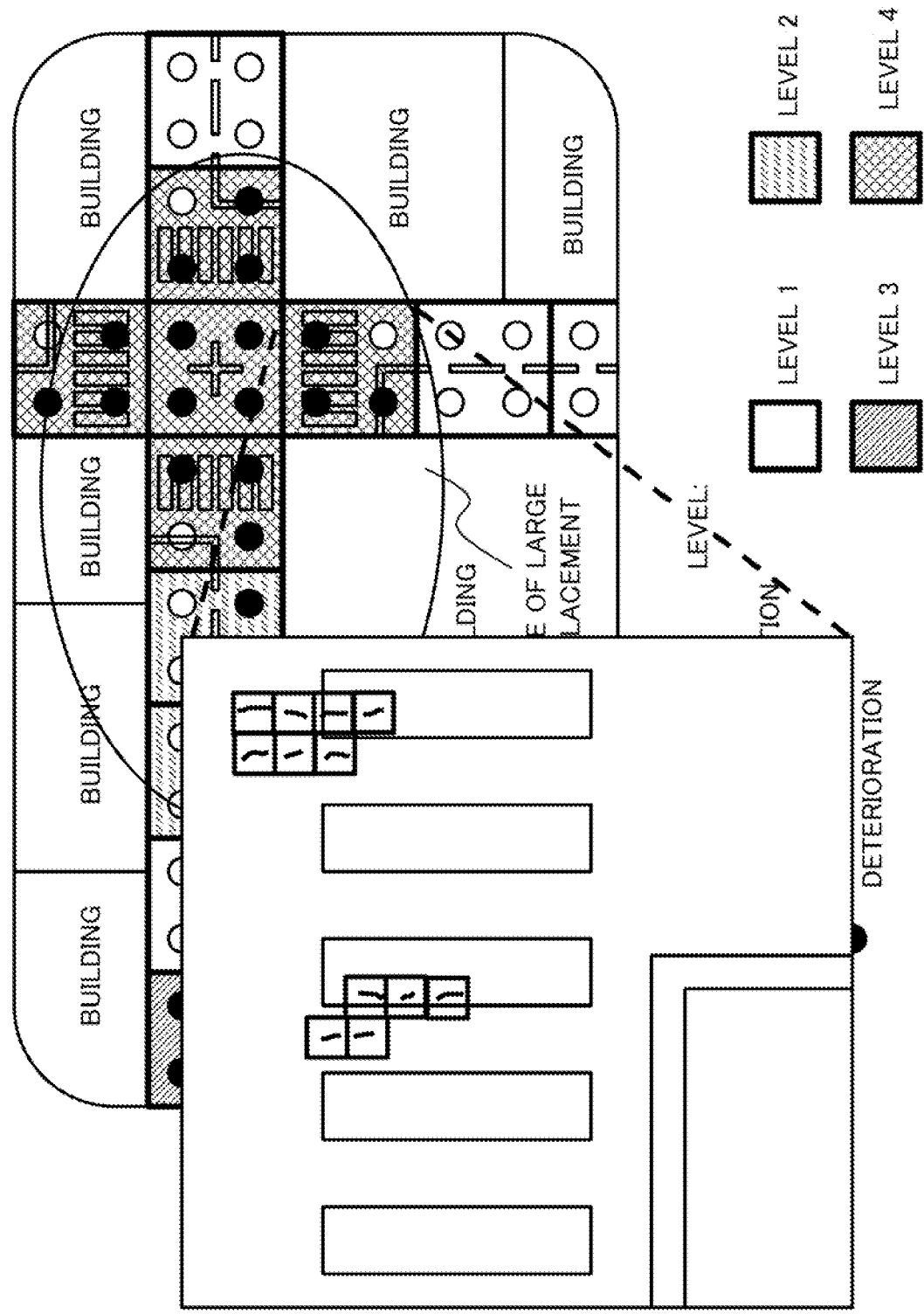
FIG. 7 is a diagram illustrating an example of highlight display.

FIG. 7 is a diagram illustrating an example of highlight display. In FIG. 7, as the highlighted display, a region determined to be cracked is surrounded by a square in the enlarged view. Further, FIG. 7 illustrates a crack in each region as an example of the display.

Alternatively, the display device 40 may display an image (moving image or still image) to be determined in addition to or instead of the enlarged view.

Figure 8:
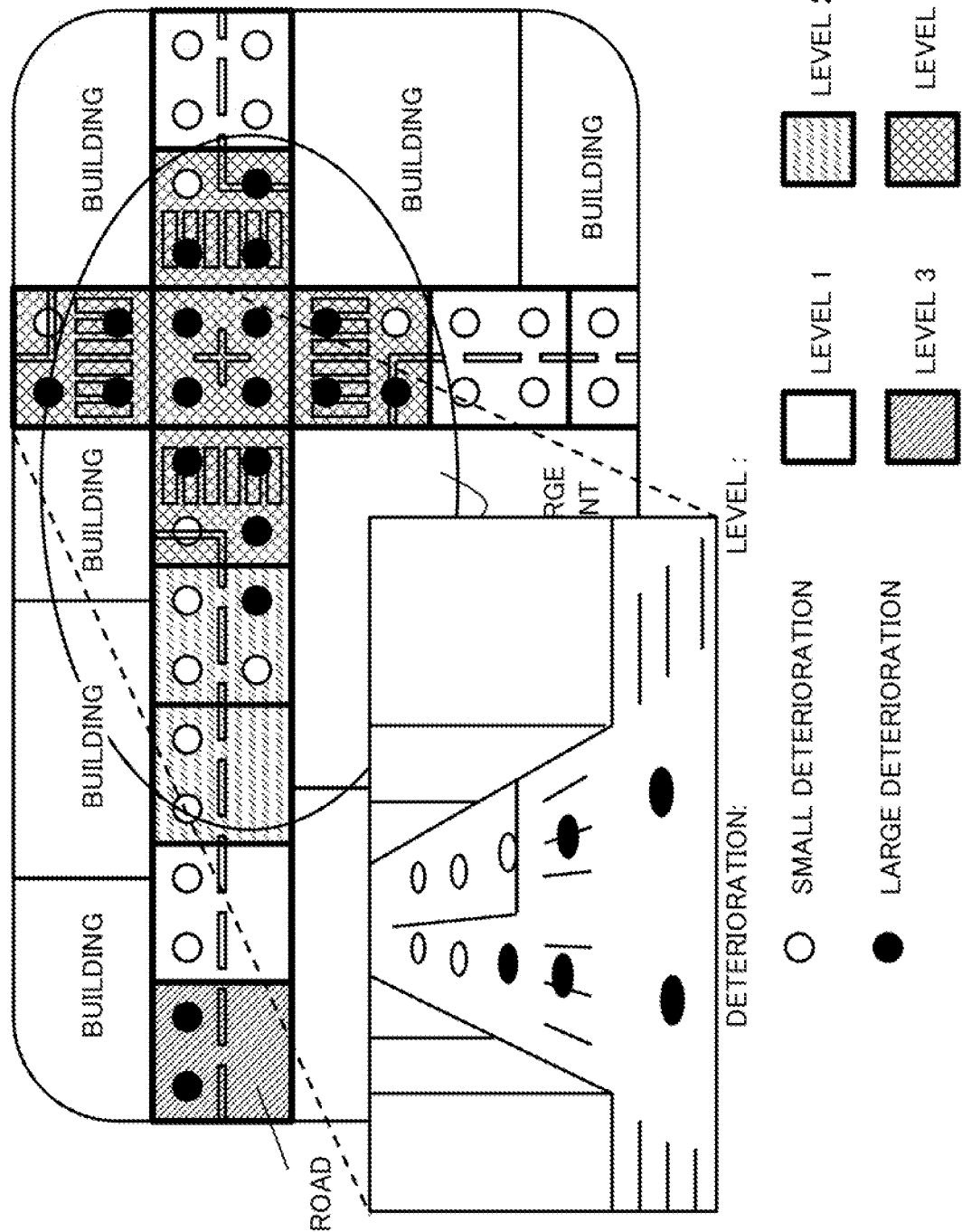
FIG. 8 is a diagram illustrating an example of display of an image.

FIG. 8 is a diagram illustrating an example of display of an image.

The display device 40 may superimpose a deterioration determination result (for example, the diagnosis result of the first deterioration, the second deterioration, the determined level of deterioration, the displacement of the ground surface (sinking and/or protrusion)) in the deterioration determination device 10 on the image. Alternatively, the display device 40 may highlight the deterioration position in the image.

Figure 9:
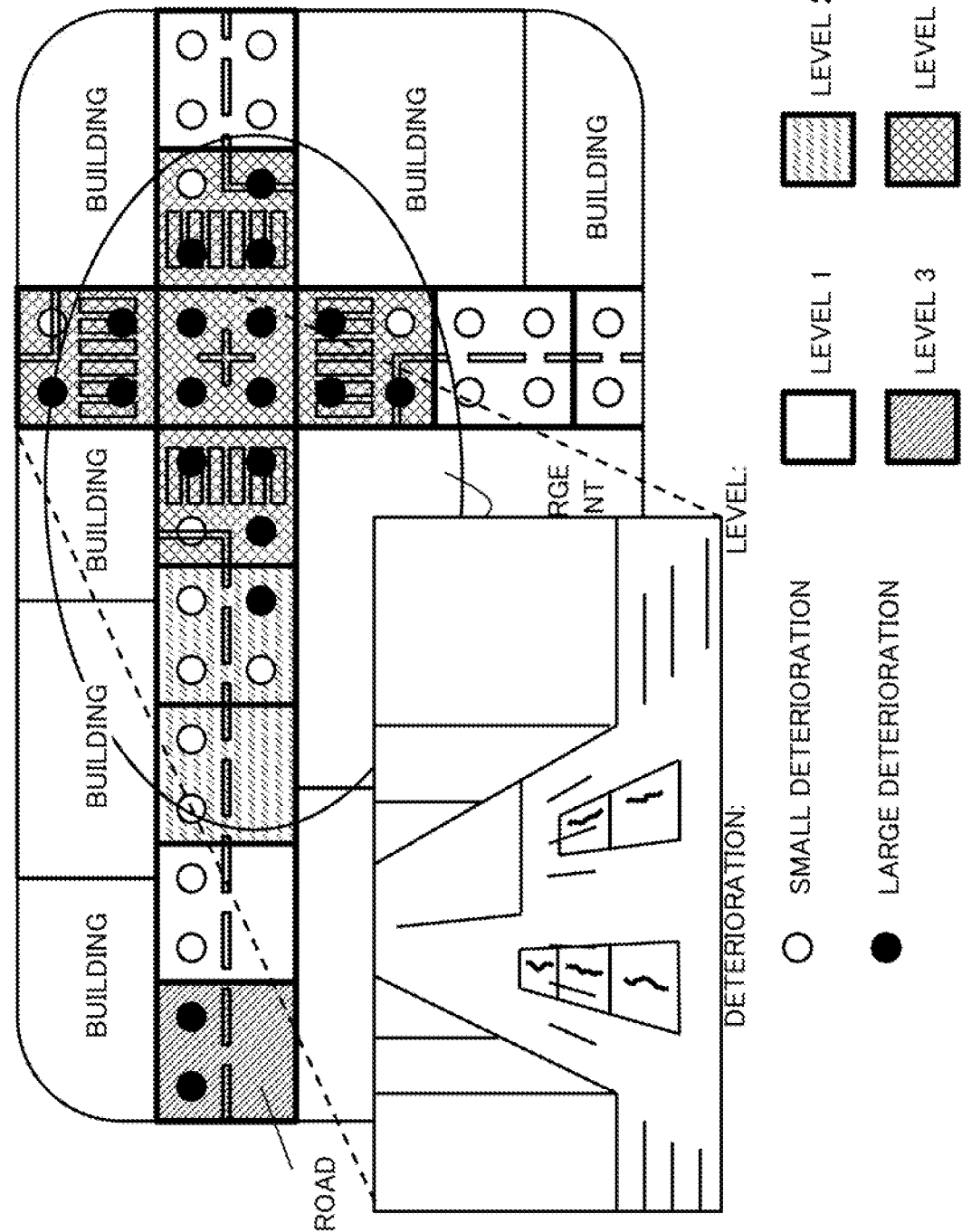
FIG. 9 is a diagram illustrating an example of highlight display in a still image.

FIG. 9 is a diagram illustrating an example of highlight display in the still image. FIG. 9 illustrates a square indicating a cracked region and a crack in the square as an example of highlighting.

Further, display device 40 may display information (for example, menu) for selecting display.

Figure 10:
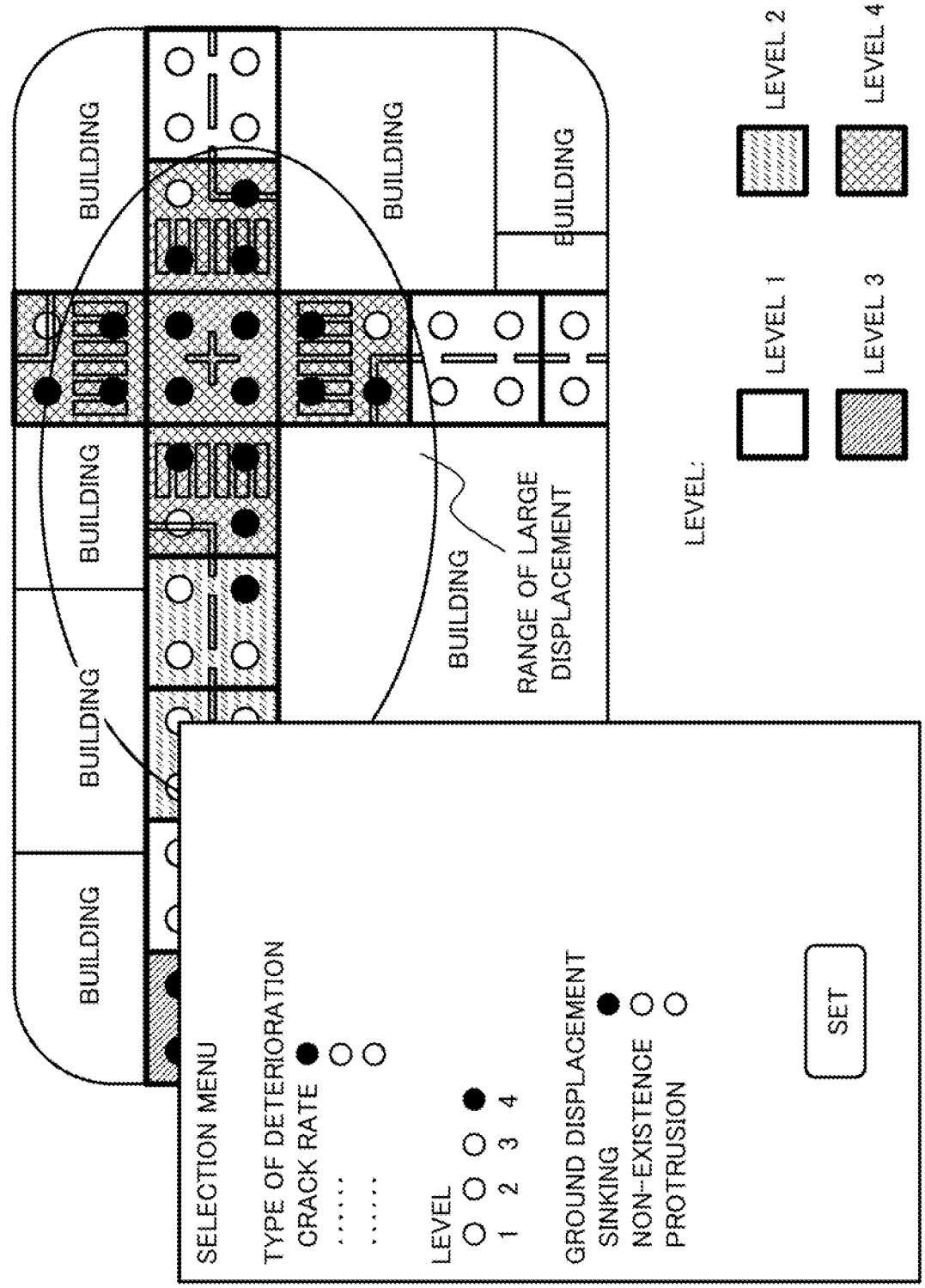
FIG. 10 illustrates an example of a menu for selecting display.

FIG. 10 illustrates an example of a menu for selecting display. FIG. 10 illustrates, as an example of the menu, a menu for selecting a type of deterioration to be displayed, a level, and a type of ground displacement. FIG. 10 illustrates a case where the display of the crack rate, Level 4, and the sinking is selected. The display device 40 can change the deterioration display using such a menu. For example, the display device 40 may use such a menu to switch between ON and OFF of the display (for example, a marker) of the deterioration and the display of the ground displacement.

However, these drawings are for describing an example of display. The display of the display device 40 is not limited thereto.

Description of Operation

Next, an operation of the deterioration determination device 10 according to the first example embodiment will be described with reference to the drawings.

Figure 11:
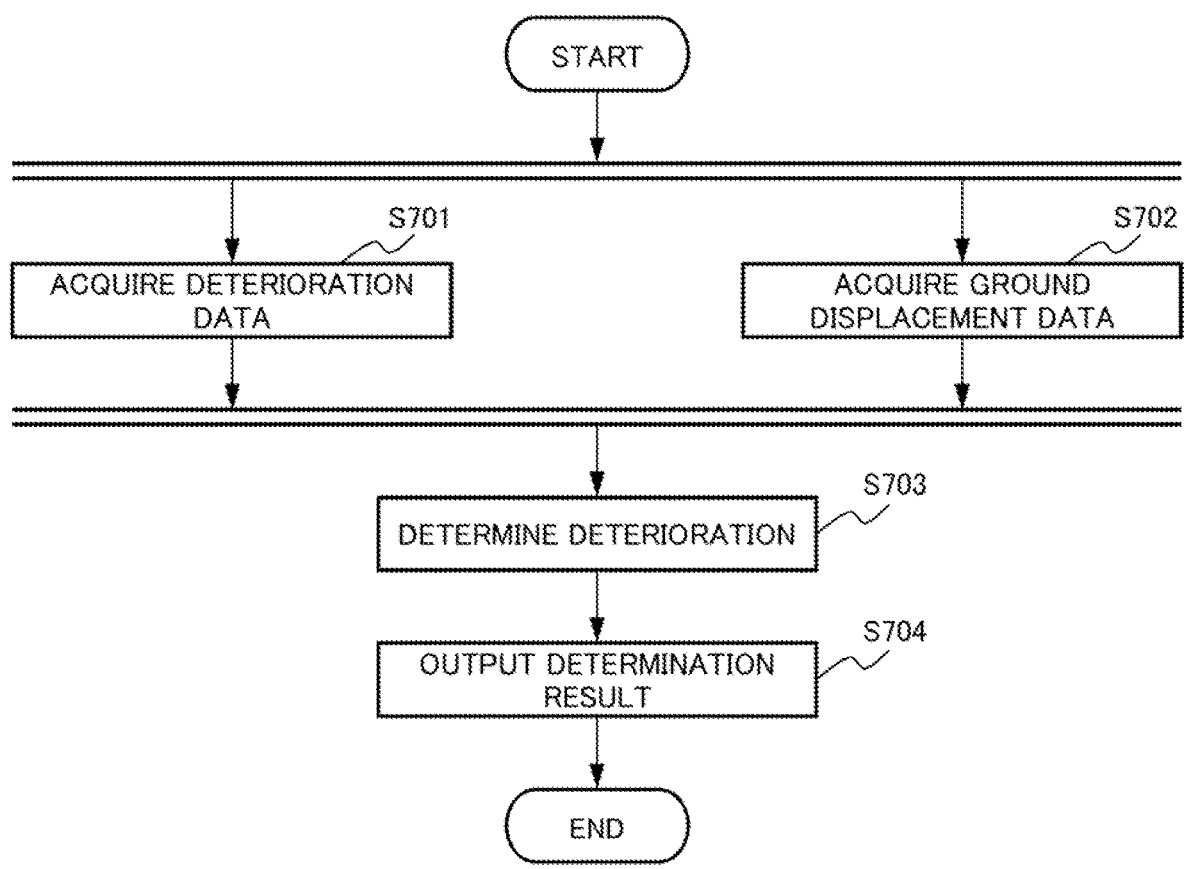
FIG. 11 is a flowchart illustrating an example of an operation of the deterioration determination device according to the first example embodiment.

FIG. 11 is a flowchart illustrating an example of the operation of the deterioration determination device 10 according to the first example embodiment.

The deterioration determination device 10 acquires deterioration data (Step S701).

The deterioration determination device 10 further acquires ground displacement data (Step S702).

The order of the operations in Steps S701 and S702 may be switched. Alternatively, the deterioration determination device 10 may execute Steps S701 and S702 in parallel at least partially.

Since Steps S701 and S702 may be executed in parallel as described above, Steps S701 and S702 are sandwiched by double lines in FIG. 11.

The deterioration determination device 10 may execute either or both of Steps S701 and S702 a plurality of times. Further, when both Steps S701 and S702 are executed a plurality of times, the deterioration determination device 10 may execute Steps S701 and S702 a different number of times.

The deterioration determination device 10 determines deterioration of the structure using the deterioration data and the ground displacement data (Step S703).

Then, the deterioration determination device 10 outputs a determination result (Step S704).

Description of Effects

Next, effects of the deterioration determination device 10 according to the first example embodiment will be described.

The deterioration determination device 10 according to the first example embodiment can achieve an effect of improving accuracy in the determination of the deterioration of the structure.

The reason is as follows.

The deterioration determination device 10 includes the acquisition unit 110, the determination unit 130, and the output unit 140. The acquisition unit 110 acquires the diagnosis result of the first deterioration of the structure and the determination result of the displacement of the ground surface including the structure. The determination unit 130 determines the second deterioration of the structure using the diagnosis result (for example, deterioration data) of the first deterioration and the determination result (for example, the ground displacement data) of the displacement of the ground surface. The output unit 140 outputs the second deterioration and the position of the second deterioration.

The deterioration does not necessarily proceed from the surface (for example, the surface layer of the road surface) of the structure.

For example, the ground that is the base of the paved road is not necessarily fixed. For example, ground sinking occurs in a wide range to some extent based on a change (for example, depletion of groundwater) in the underground structure of the ground or the like. When the ground sinking occurs, the structure (for example, a road) based on the ground deteriorates with the sinking of the ground.

When the ground sinking occurs in a certain range, the road in the region where the ground sinking has occurred is deformed downward with respect to the road in the surrounding region. In this case, the deformation of the pavement is larger on the side (that is, the side farther from the surface layer) closer to the ground. Therefore, the number of cracks of the pavement generated from the side close to the ground is larger than the number of cracks generated from the surface.

As described above, in the determination of deterioration of the structure, it is desirable to consider a change (for example, displacement of the ground surface serving as a base of the structure) in a wider range including the structure such as the ground sinking, in addition to the state of the shape of the surface of the structure.

Therefore, based on the above configuration, the deterioration determination device 10 determines deterioration of the structure using the determination result (ground displacement data) of the displacement of the ground surface including the structure in addition to the diagnosis result (for example, deterioration data) of the first deterioration of the structure. Therefore, the deterioration determination device 10 achieves an effect that the accuracy of the deterioration determination of the structure can be improved as compared with the case of performing the determination simply using the uneven state of the surface of the structure.

The deterioration determination device 10 further includes the deterioration determination unit 150 and the image analysis unit 160. The deterioration determination unit 150 generates the deterioration data using the sensor information related to the surface layer of the structure acquired by the terminal device mounted on the mobile body. The image analysis unit 160 generates the ground displacement data using the observation result of the synthetic aperture radar (SAR). Therefore, the deterioration determination device 10 can achieve the deterioration determination using the deterioration data and the ground displacement data, using the sensor information acquired from the drive recorder 20 and the observation result acquired from the SAR 30.

The deterioration determination system 50 includes the display device 40 in addition to the deterioration determination device 10. Therefore, the deterioration determination system 50 can provide the user with a display of a result determined by the deterioration determination device 10. Therefore, the user or the like can grasp deterioration of the structure with improved determination accuracy.

The deterioration determination system 50 further includes the drive recorder 20 and the SAR 30. Therefore, the deterioration determination system 50 can acquire the sensor information used for determination by the deterioration determination device 10 and the observation result of the ground surface.

Application Example

A specific application example of the deterioration determination using the deterioration data and the ground displacement data in the deterioration determination device 10 will be described.

(1) Determine Deterioration of Bridge

As deterioration of a bridge progresses, deflection and shaking increase.

When the bridge is deflected (more specifically, a case where a frame constituting a bridge, a wire of a suspension bridge, or the like is deformed), a surface (surface on which the SAR 30 can be measured) of the bridge is displaced. Therefore, the deterioration determination device 10 can use the displacement of the bridge portion included in the ground displacement data as the deflection of the bridge.

When the bridge is deflected, deterioration such as crack is large and/or increases. The deterioration determination device 10 can determine the degree of deterioration such as crack of the bridge using the deterioration included in the deterioration data.

Then, the deterioration determination device 10 determines deterioration using both the deterioration data and the ground displacement data. Therefore, the deterioration determination device 10 can improve the accuracy of the determination of the deflection of the bridge as compared with the case where the determination is made simply using the deterioration of the surface layer.

The drive recorder 20 includes a model capable of measuring acceleration. Alternatively, the vehicle equipped with the drive recorder 20 may be equipped with an accelerometer. In these cases, the deterioration data may include acceleration.

When the bridge swings largely, the acceleration (in particular, acceleration in vertical direction and horizontal direction) of the vehicle on which the drive recorder 20 is mounted increases. Therefore, when the deterioration data includes the acceleration, the deterioration determination device 10 may determine deterioration of the bridge including the acceleration. In this case, the deterioration determination device 10 can further improve the accuracy of the determination.

(2) Determine Deterioration Associated with Underground Construction

In the case of construction such as shield construction in which a space is provided under the ground, the ground surface may sink. However, it is difficult to determine a risk of occurrence of caving or the like only by a sinking amount. However, before caving or the like, deterioration such as crack occurs. That is, the determination using the sinking amount and the deterioration such as a crack can improve the accuracy of the determination of the risk such as the caving as compared with the case of the determination simply using the sinking amount.

The deterioration determination device 10 determines deterioration using the deterioration included in the deterioration data and the displacement of the ground surface included in the ground displacement data. Therefore, the deterioration determination device 10 can more accurately determine the risk such as the caving due to the construction to provide the space under the ground such as the shield construction.

When the deterioration data includes an image, the deterioration determination device 10 may output the image of the surface layer according to the determination result. In this case, the user can more appropriately grasp the risk using the image in addition to the determination of the deterioration determination device 10.

(3) Seawall

The deterioration determination device 10 is not limited to deterioration of horizontal surfaces such as roads and runways, and may determine deterioration of slopes and vertical surfaces such as seawalls for preventing erosion and destruction on coasts and river banks.

For example, the seawall has a problem of a lateral flow. The lateral flow means that a lateral flow is generated from an embankment side of the seawall, and a pile breakage, a road surface crack, and the like are generated.

The ground displacement data includes displacement associated with the lateral flow of the seawall.

However, it is difficult to determine the risk such as the pile breakage in the lateral flow only by a displacement amount. However, before the pile breakage or the like, deterioration such as a crack, which is deterioration on a smaller scale than the pile breakage or the like, occurs on the seawall and/or a road surface around the seawall. That is, the determination using the displacement amount of the seawall and the deterioration such as the crack of the surface layer of the seawall and/or the road surface around the seawall can improve the accuracy of the determination of the risk such as the pile breakage as compared with the case of the determination using only the displacement amount of the seawall.

The deterioration determination device 10 determines deterioration using the deterioration of the surface layer included in the deterioration data and the displacement included in the ground displacement data. Therefore, the deterioration determination device 10 can more accurately determine the risk of the pile breakage or the like associated with the lateral flow in the seawall or the like.

Also in this case, the deterioration determination device 10 may output the image of the surface layer according to the determination result.

(4) Complement of Data

The image acquired by the drive recorder 20 includes an image in which deterioration cannot be determined or deterioration determination accuracy is low. For example, it is difficult to determine deterioration of an image captured at night. Alternatively, on a runway and a road, tire marks may hide cracks. Therefore, the deterioration data may not include deterioration in such a portion. Such a portion is desirably subjected to visual inspection or the like as determination of deterioration.

Therefore, the deterioration determination device 10 may prompt the user to perform deterioration inspection (for example, visual inspection) on a portion where it is determined that the displacement in the ground displacement data is larger than the displacement threshold value but the deterioration of the deterioration data is smaller than the deterioration threshold value.

When the deterioration data includes an image, the deterioration determination device 10 may prompt the inspection using the image of the target part. In this case, the user can determine whether it is necessary to inspect the part where the inspection is urged (for example, whether the portion is a portion where the tire mark or the like covers deterioration) with reference to the image.

Alternatively, the deterioration determination device 10 may output, based on the instruction of the user, a portion where the displacement in the ground displacement data is larger than the displacement threshold value, but the deterioration of the deterioration data is smaller than the deterioration threshold value.

(5) Extension of Ground Displacement Data

The SAR 30 is not limited to the displacement of the ground surface, and can observe displacement of a height of a construction or the like. For example, in the construction or the like, the total of the displacements from a ground leveling state before the start of construction observed by the SAR 30 is the height of the construction. Alternatively, the observation results of the SAR 30 can be used to extract a change in a construction, such as a construction being constructed in an open lot.

In some regions, the height of the construction is limited. For example, the height of the construction is limited in a predetermined range around an airport.

Meanwhile, the deterioration determination device 10 can determine deterioration of a runway, a taxiway, an apron, and the like in an airport as the deterioration of the structure.

Therefore, for example, the deterioration determination system 50 may output a combination of the determination result of the deterioration determination device 10 for a runway or the like and a change in height (alternatively, the height of the construction) of the construction around the airport measured by the SAR 30. For example, the deterioration determination system 50 may display, on the display device 40 or a device not illustrated, a combination of the determination result of the deterioration determination device 10 for a runway or the like and a change in height (alternatively, the height of the construction) of a construction around the airport extracted using the observation result of the SAR 30. Further, the deterioration determination system 50 may display new constructions around the airport.

In this case, the user can grasp the displacement of the construction (or the height of the construction) in the region around the airport in addition to the deterioration state of the runway or the like of the airport.

Second Example Embodiment

A deterioration determination device 10 according to a second example embodiment is the same as the deterioration determination device 10 of the first example embodiment except for an operation of a determination unit 130.

Therefore, description of configurations and operations similar to those of the first example embodiment will be omitted, and configurations and operations specific to the second example embodiment will be described.

A structure serving as a social infrastructure is generally large in scale. Therefore, it is desirable to limit a range of a determination target such as deterioration in structure management.

It is estimated that the deterioration of the object progresses faster in a range where the displacement of the ground surface is large than in a range where the displacement of the ground surface is small.

Therefore, the determination unit 130 according to the second example embodiment first extracts a range in which the displacement is larger than the displacement threshold value using the ground displacement data. Then, the determination unit 130 determines deterioration of the structure using the deterioration data and the ground displacement data included in the extracted range.

Description of Effects

Next, effects of the deterioration determination device 10 according to the second example embodiment will be described.

The deterioration determination device 10 according to the second example embodiment can reduce a load of determination in addition to the effects of the first example embodiment.

The reason is as follows.

The determination unit 130 according to the second example embodiment extracts the range in which the displacement of the ground surface is large using the ground displacement data, and determines deterioration in the extracted range. In this manner, the determination unit 130 limits the range in which the deterioration is determined.

In the techniques described in PTLs 1 and 2, deterioration is determined based on the irregularity shape of the surface of the structure, and thus the above-described effect cannot be achieved.

Variations

The deterioration determination device 10 may control the acquisition of the sensor information in the drive recorder 20 that acquires the sensor information used for the deterioration data using the ground displacement data.

For example, the deterioration determination device 10 may instruct the drive recorder 20 to collect the deterioration data in a range (hereinafter, "large displacement range") in which the displacement is larger than the displacement threshold value in the ground displacement data.

Alternatively, the deterioration determination device 10 may instruct the drive recorder 20 to change the type of data acquired to determine deterioration in the large displacement range.

For example, the deterioration determination device 10 may instruct the drive recorder 20 to increase a frame rate of the image in the large displacement range. Alternatively, the deterioration determination device 10 may instruct the drive recorder 20 to normally acquire a still image and to acquire a moving image in the large displacement range. In these cases, the deterioration determination device 10 can acquire more detailed information in the large displacement range as the sensor information for generating the deterioration data.

Third Example Embodiment

A deterioration determination device 10 according to a third example embodiment is the same as the deterioration determination device 10 of the first example embodiment except for an operation of a determination unit 130.

Therefore, description of configurations and operations similar to those of the first example embodiment will be omitted, and configurations and operations specific to the third example embodiment will be described.

A structure serving as a social infrastructure is generally large in scale. Therefore, it is desirable to limit a range of a determination target such as deterioration in structure management.

Furthermore, a point determined to be deteriorated in the deterioration data is a candidate for repair. However, repairing a structure requires a lot of cost and time.

Therefore, it is desired to provide information related to priority of repair.

For example, the deteriorated portion includes a portion in which deterioration has progressed to the deep layer and which needs urgent repair, and a portion in which the range of deterioration is the surface layer and a certain period of time may elapse until repair.

In this manner, it is desirable to be able to determine the repair priority with respect to deterioration.

Therefore, the determination unit 130 according to the third example embodiment first extracts a point (that is, a point needs to be repaired) where the deterioration is larger than the deterioration threshold value using the deterioration data. Then, similarly to the first example embodiment, the determination unit 130 uses the deterioration data and the ground displacement data at the point to determine the deterioration at the point.

In the third example embodiment, the SAR 30 may determine displacement in the ground displacement data in detail in a range in which the deterioration is larger than the deterioration threshold value.

Description of Effects

Next, effects of the deterioration determination device 10 according to the third example embodiment will be described.

The deterioration determination device 10 according to the third example embodiment can reduce the load of determination in addition to the effects of the first example embodiment.

The reason is as follows.

The determination unit 130 according to the third example embodiment extracts the point of the deterioration using the deterioration data, and determines the deterioration at the extracted point. That is, the determination unit 130 according to the third example embodiment first extracts the point where deterioration has occurred using the deterioration data. Then, the determination unit 130 determines the deterioration at the extracted point using the ground displacement data. In this manner, the determination unit 130 reduces the number of deterioration points to be determined.

Fourth Example Embodiment

The deterioration determination device 10 may use an external storage device (not illustrated) as the storage unit 120.

Alternatively, the acquisition unit 110 may acquire deterioration data and ground displacement data generated by a device having functions similar to those of the deterioration determination unit 150 and the image analysis unit 160. That is, the deterioration determination device 10 may acquire the deterioration data and the ground displacement data from a device having a similar function without including the deterioration determination unit 150 and the image analysis unit 160.

Then, the determination unit 130 may acquire the deterioration data and the ground displacement data from the acquisition unit 110.

Next, an outline of the deterioration determination device 10 will be described with reference to the drawings.

Figure 12:
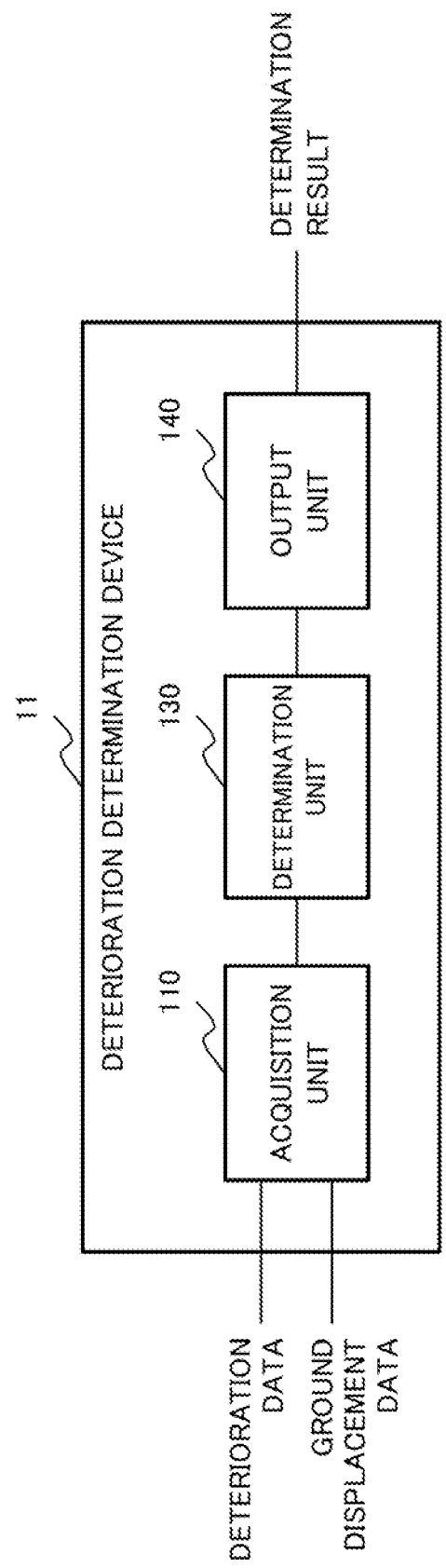
FIG. 12 is a block diagram illustrating an outline configuration of the deterioration determination device.

FIG. 12 is a block diagram illustrating a configuration of a deterioration determination device 11 which is an example of an outline of the deterioration determination device 10.

The deterioration determination device 11 includes the acquisition unit 110, the determination unit 130, and the output unit 140. The acquisition unit 110 acquires the diagnosis result (for example, deterioration data) of the first deterioration of the structure and the determination result (for example, the ground displacement data) of the displacement of the ground surface including the structure. The determination unit 130 determines the second deterioration of the structure using the diagnosis result of the first deterioration and the determination result of the displacement of the ground surface. The output unit 140 outputs the second deterioration and the position of the second deterioration.

Each configuration of the deterioration determination device 11 operates similarly to each corresponding configuration in the deterioration determination device 10.

The deterioration determination device 11 configured as described above can obtain an effect similar to that of the deterioration determination device 10.

This is because each configuration of the deterioration determination device 11 operates similarly to the similar configuration in the deterioration determination device 10.

The deterioration determination device 11 has a minimum configuration of the deterioration determination device 10.

Hardware Configuration

Next, a hardware configuration of the deterioration determination devices 10 and 11 will be described using the deterioration determination device 10.

Each component of the deterioration determination device 10 may be configured by a hardware circuit.

Alternatively, in the deterioration determination device 10, each component may be configured using a plurality of devices connected via a network. For example, the deterioration determination device 10 may be configured using cloud computing.

Alternatively, in the deterioration determination device 10, the plurality of components may be configured by one piece of hardware.

Alternatively, the deterioration determination device 10 may be achieved as a computer device including a central processing unit (CPU), a read only memory (ROM), and a random access memory (RAM). The deterioration determination device 10 may be achieved as a computer device including a network interface circuit (NIC) in addition to the above configuration.

Figure 13:
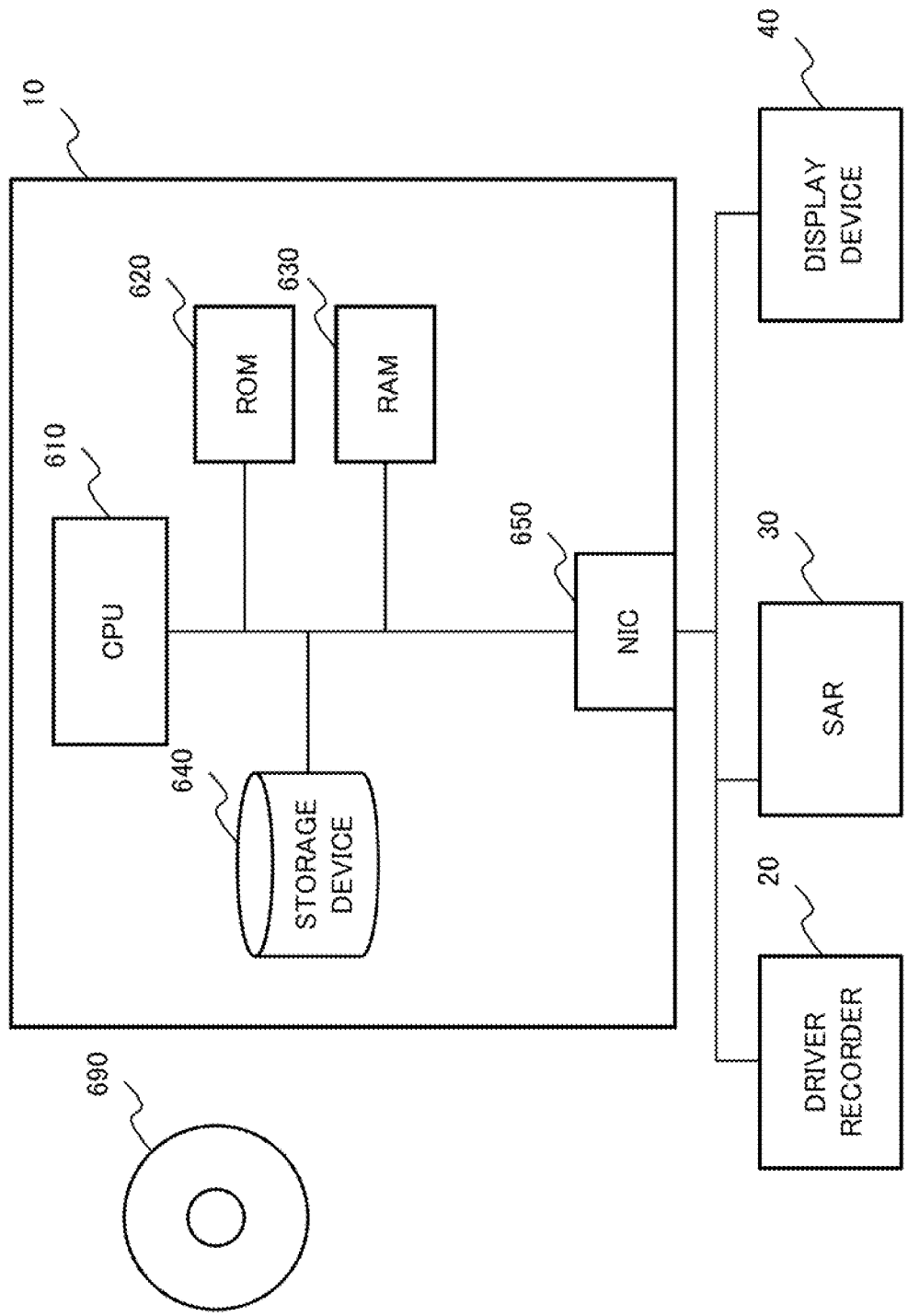
FIG. 13 is a block diagram illustrating an example of a hardware configuration of the deterioration determination device.

FIG. 13 is a block diagram illustrating an example of a hardware configuration of the deterioration determination device 10.

The deterioration determination device 10 includes a CPU 610, a ROM 620, a RAM 630, a storage device 640, and an NIC 650, and constitutes a computer device.

The CPU 610 reads a program from the ROM 620 and/or the storage device 640. Then, the CPU 610 controls the RAM 630, the storage device 640, the IOC 650, and the NIC 650 based on the read program. Then, the computer including the CPU 610 controls these configurations to achieve the functions of the acquisition unit 110, the determination unit 130, the output unit 140, the deterioration determination unit 150, and the image analysis unit 160 illustrated in FIG. 1.

When achieving each function, the CPU 610 may use the RAM 630 or the storage device 640 as a temporary storage medium of the program.

The CPU 610 may read a program included in a recording medium 690 storing the program in a computer readable manner using a recording medium reading device (not illustrated). Alternatively, the CPU 610 may receive a program from an external device (not illustrated) via the NIC 650, store the program in the RAM 630 or the storage device 640, and operate based on the stored program.

The ROM 620 stores programs executed by the CPU 610 and fixed data. The ROM 620 is, for example, a programmable-ROM (P-ROM) or a flash ROM.

The RAM 630 temporarily stores programs and data executed by the CPU 610. The RAM 630 is, for example, a dynamic-RAM (D-RAM).

The storage device 640 stores data and programs to be stored for a long time by the deterioration determination device 10. The storage device 640 constitutes the storage unit 120. The storage device 640 may operate as a temporary storage device of the CPU 610. The storage device 640 is, for example, a hard disk device, a magneto-optical disk device, a solid state drive (SSD), or a disk array device.

The ROM 620 and the storage device 640 are non-volatile (non-transitory) recording media. Meanwhile, the RAM 630 is a volatile (transitory) recording medium. The CPU 610 is operable based on a program stored in the ROM 620, the storage device 640, or the RAM 630. That is, the CPU 610 can operate using a non-volatile recording medium or a volatile recording medium.

The NIC 650 relays exchange of data with an external device such as the display device 40 via a network. The NIC 650 is, for example, a local area network (LAN) card. Furthermore, the NIC 650 is not limited to wired communication, and may be wireless communication.

The deterioration determination device 10 configured as described above can obtain effects similar to those of the deterioration determination device 10 of FIG. 1.

This is because the CPU 610 of the deterioration determination device 10 of FIG. 13 can achieve the same function as that of the deterioration determination device 10 of FIG. 1 based on the program.

Some or all of the above example embodiments may be described as the following Supplementary Notes, but are not limited to the following.

Supplementary Note 1

A deterioration determination device includes:
a memory; and
at least one processor coupled to the memory.
The processor performs operations. The operations include:
acquiring a diagnosis result of first deterioration of a structure and a determination result of displacement of a ground surface including the structure;
determining second deterioration of the structure using the diagnosis result of the first deterioration and the determination result of the displacement of the ground surface; and
outputting the second deterioration and a position of the second deterioration.

Supplementary Note 2

The deterioration determination device according to Supplementary Note 1, wherein
either or both of the diagnosis result of the first deterioration and the determination result of the displacement of the ground surface is time-series data.

Supplementary Note 3

The deterioration determination device according to Supplementary Note 1 or 2, wherein
the diagnosis result of the first deterioration includes deterioration of a surface layer of the structure and a position of the deterioration, and
the determination result of the displacement of the ground surface includes a displacement of the ground surface including the structure and a position of the displacement.

Supplementary Note 4

The deterioration determination device according to Supplementary Note 3, wherein the operations further include:
extracting a range in which a displacement included in the determination result of the displacement of the ground surface is larger than a displacement threshold value in the determination result of the displacement of the ground surface, and determining the second deterioration using the diagnosis result of the first deterioration and the determination result of the displacement of the ground surface included in the extracted range.

Supplementary Note 5

The deterioration determination device according to Supplementary Note 3, wherein the operations further include:
extracting a point at which a deterioration included in the diagnosis result of the first deterioration is larger than a deterioration threshold value in the diagnosis result of the first deterioration, and determining the second deterioration using the diagnosis result of the first deterioration and the determination result of the displacement of the ground surface at the extracted point.

Supplementary Note 6

The deterioration determination device according to any one of Supplementary Notes 1 to 5, wherein the operations further include:
generating the diagnosis result of the first deterioration using sensor information related to a surface layer of the structure acquired by a terminal device mounted on a mobile body; and
generating the determination result of the displacement of the ground surface using an observation result of a synthetic aperture radar.

Supplementary Note 7

A deterioration determination system includes:
the deterioration determination device according to Supplementary Note 6;
the terminal device mounted on a mobile body that transmits the diagnosis result of the first deterioration to the deterioration determination device;
the synthetic aperture radar that transmits a determination result of a displacement of the ground surface including the structure to the deterioration determination device; and
a display device that acquires the second deterioration and a position of the second deterioration from the deterioration determination device, and displays the second deterioration in association with the position of the second deterioration.

Supplementary Note 8

A deterioration determination method includes:
acquiring a diagnosis result of first deterioration of a structure and a determination result of a displacement of a ground surface including the structure;
determining second deterioration of the structure using the diagnosis result of the first deterioration and the determination result of a displacement of the ground surface; and
outputting the second deterioration and a position of the second deterioration.

Supplementary Note 9

The deterioration determination method according to Supplementary Note 8, wherein
either or both of the diagnosis result of the first deterioration and the determination result of the displacement of the ground surface is time-series data.

Supplementary Note 10

The deterioration determination method according to Supplementary Note 8 or 9, wherein
the diagnosis result of the first deterioration includes deterioration of a surface layer of the structure and a position of the deterioration, and
the determination result of the displacement of the ground surface includes a displacement of the ground surface including the structure and a position of the displacement.

Supplementary Note 11

The deterioration determination method according to Supplementary Note 10, further includes:
extracting a range in which a displacement included in the determination result of the displacement of the ground surface is larger than a displacement threshold value in the determination result of the displacement of the ground surface, and determining the second deterioration using the diagnosis result of the first deterioration and the determination result of the displacement of the ground surface included in the extracted range.

Supplementary Note 12

The deterioration determination method according to Supplementary Note 10, further including:
extracting a point at which a deterioration included in the diagnosis result of the first deterioration is larger than a deterioration threshold value in the diagnosis result of the first deterioration, and determining the second deterioration using the diagnosis result of the first deterioration and the determination result of the displacement of the ground surface at the extracted point.

Supplementary Note 13

The deterioration determination method according to any one of Supplementary Notes 8 to 12, further including:
generating the diagnosis result of the first deterioration using sensor information related to a surface layer of the structure acquired by a terminal device mounted on a mobile body; and
generating the determination result of the displacement of the ground surface using an observation result of a synthetic aperture radar.

Supplementary Note 14

A deterioration determination method includes:
executing, by a deterioration determination device, the deterioration determination method according to Supplementary Note 13;
transmitting, by a terminal device mounted on a mobile body, the diagnosis result of the first deterioration to the deterioration determination device;
transmitting, by a synthetic aperture radar, a determination result of a displacement of the ground surface including the structure to the deterioration determination device; and
acquiring, by a display device, the second deterioration and a position of the second deterioration from the deterioration determination device, and displaying the second deterioration in association with the position of the second deterioration.

Supplementary Note 15

A non-transitory computer-readable recording medium embodies a program causing a computer to perform a method. The method includes:
acquiring a diagnosis result of first deterioration of a structure and a determination result of a displacement of a ground surface including the structure;
determining second deterioration of the structure using the diagnosis result of the first deterioration and the determination result of the displacement of the ground surface; and outputting the second deterioration and a position of the second deterioration.

Supplementary Note 16

The recording medium according to Supplementary Note 15, wherein
either or both of the diagnosis result of the first deterioration and the determination result of the displacement of the ground surface is time-series data.

Supplementary Note 17

The recording medium according to Supplementary Note 15 or 16, wherein
the diagnosis result of the first deterioration includes deterioration of a surface layer of the structure and a position of the deterioration, and
the determination result of the displacement of the ground surface includes a displacement of the ground surface including the structure and a position of the displacement.

Supplementary Note 18

The recording medium according to Supplementary Note 17, further embodies a program causing a computer to perform a method. The method includes:
extracting a range in which a displacement included in the determination result of the displacement of the ground surface is larger than a displacement threshold value in the determination result of the displacement of the ground surface, and determining the second deterioration using the diagnosis result of the first deterioration and the determination result of the displacement of the ground surface included in the extracted range.

Supplementary Note 19

The recording medium according to Supplementary Note 17, further embodies a program causing a computer to perform a method. The method includes:
extracting a point at which a deterioration included in the diagnosis result of the first deterioration is larger than a deterioration threshold value in the diagnosis result of the first deterioration, and determining the second deterioration using the diagnosis result of the first deterioration and the determination result of the displacement of the ground surface at the extracted point.

Supplementary Note 20

The recording medium according to any one of Supplementary Notes 15 to 19, further embodies a program causing a computer to perform a method. The method includes:
generating the diagnosis result of the first deterioration using sensor information related to a surface layer of the structure acquired by a terminal device mounted on a mobile body; and
generating the determination result of the displacement of the ground surface using an observation result of a synthetic aperture radar.

Although the present invention has been described above with reference to the example embodiments, the present invention is not limited to the above example embodiments. Various changes that can be understood by those skilled in the art can be made in the configuration and details of the present invention within the scope of the present invention.

REFERENCE SIGNS LIST 10 deterioration determination device
11 deterioration determination device
20 drive recorder
30 SAR
40 display device
50 deterioration determination system
110 acquisition unit
120 storage unit
130 determination unit
140 output unit
150 deterioration determination unit
160 image analysis unit
610 CPU
620 ROM
630 RAM
640 storage device
650 NIC
690 recording medium

What is claimed is:
1. A deterioration determination device comprising:
a memory; and
at least one processor coupled to the memory,
the processor performing operations, the operations comprising:
acquiring a diagnosis result of first deterioration of a structure and a determination result of a displacement of a ground surface including the structure;
determining second deterioration of the structure using the diagnosis result of the first deterioration and the determination result of the displacement of the ground surface; and
outputting the second deterioration and a position of the second deterioration, wherein
the diagnosis result of the first deterioration includes deterioration of a surface layer of the structure and a position of the deterioration,
the determination result of the displacement of the ground surface includes a displacement of the ground surface including the structure and a position of the displacement, and
the operations further comprise:
extracting a range in which a displacement included in the determination result of the displacement of the ground surface is larger than a displacement threshold value in the determination result of the displacement of the ground surface, and determining the second deterioration using the diagnosis result of the first deterioration and the determination result of the displacement of the ground surface included in the extracted range; or
extracting a point at which a deterioration included in the diagnosis result of the first deterioration is larger than a deterioration threshold value in the diagnosis result of the first deterioration, and determining the second deterioration using the diagnosis result of the first deterioration and the determination result of the displacement of the ground surface at the extracted point.
2. The deterioration determination device according to claim 1, wherein
either or both of the diagnosis result of the first deterioration and the determination result of the displacement of the ground surface is time-series data.

3. The deterioration determination device according to claim 1, wherein the operations further comprise:
  generating the diagnosis result of the first deterioration using sensor information related to a surface layer of the structure acquired by a terminal device mounted on a mobile body; and
  generating the determination result of the displacement of the ground surface using an observation result of a synthetic aperture radar.

4. A deterioration determination method comprising:
  acquiring a diagnosis result of first deterioration of a structure and a determination result of a displacement of a ground surface including the structure;
  determining second deterioration of the structure using the diagnosis result of the first deterioration and the determination result of a displacement of the ground surface; and
  outputting the second deterioration and a position of the second deterioration, wherein
  the diagnosis result of the first deterioration includes deterioration of a surface layer of the structure and a position of the deterioration,
  the determination result of the displacement of the ground surface includes a displacement of the ground surface including the structure and a position of the displacement, and
  the deterioration determination method further comprises:
  extracting a range in which a displacement included in the determination result of the displacement of the ground surface is larger than a displacement threshold value in the determination result of the displacement of the ground surface, and determining the second deterioration using the diagnosis result of the first deterioration and the determination result of the displacement of the ground surface included in the extracted range; or
  extracting a point at which a deterioration included in the diagnosis result of the first deterioration is larger than a deterioration threshold value in the diagnosis result of the first deterioration, and determining the second deterioration using the diagnosis result of the first deterioration and the determination result of the displacement of the ground surface at the extracted point.

5. The deterioration determination method according to claim 4, wherein
  either or both of the diagnosis result of the first deterioration and the determination result of the displacement of the ground surface is time-series data.

6. The deterioration determination method according to claim 4, further comprising:
  generating the diagnosis result of the first deterioration using sensor information related to a surface layer of the structure acquired by a terminal device mounted on a mobile body; and
  generating the determination result of the displacement of the ground surface using an observation result of a synthetic aperture radar.

7. A non-transitory computer-readable recording medium embodying a program, the program causing a computer to perform a method, the method comprising:
  acquiring a diagnosis result of first deterioration of a structure and a determination result of a displacement of a ground surface including the structure;
  determining second deterioration of the structure using the diagnosis result of the first deterioration and the determination result of the displacement of the ground surface; and
  outputting the second deterioration and a position of the second deterioration, wherein
  the diagnosis result of the first deterioration includes deterioration of a surface layer of the structure and a position of the deterioration,
  the determination result of the displacement of the ground surface includes a displacement of the ground surface including the structure and a position of the displacement, and
  the recording medium further embodies a program causing a computer to perform a method, the method comprises:
  extracting a range in which a displacement included in the determination result of the displacement of the ground surface is larger than a displacement threshold value in the determination result of the displacement of the ground surface, and determining the second deterioration using the diagnosis result of the first deterioration and the determination result of the displacement of the ground surface included in the extracted range; or
  extracting a point at which a deterioration included in the diagnosis result of the first deterioration is larger than a deterioration threshold value in the diagnosis result of the first deterioration, and determining the second deterioration using the diagnosis result of the first deterioration and the determination result of the displacement of the ground surface at the extracted point.

8. The recording medium according to claim 7, wherein
  either or both of the diagnosis result of the first deterioration and the determination result of the displacement of the ground surface is time-series data.

9. The recording medium according to claim 7, further embodying a program causing a computer to perform a method, the method comprising:
  generating the diagnosis result of the first deterioration using sensor information related to a surface layer of the structure acquired by a terminal device mounted on a mobile body; and
  generating the determination result of the displacement of the ground surface using an observation result of a synthetic aperture radar.

* * * * *